United States Patent [19]

Shiratsuchi et al.

[11] Patent Number: 5,362,613
[45] Date of Patent: Nov. 8, 1994

[54] CATIONIC HIGH-MOLECULAR WEIGHT COMPOUND

[75] Inventors: Kentaro Shiratsuchi; Fumio Kawamoto, both of Kanagawa, Japan

[73] Assignee: Fuji Photo Film Co., Ltd., Kanagawa, Japan

[21] Appl. No.: 5,114

[22] Filed: Jan. 15, 1993

[30] Foreign Application Priority Data

Jan. 17, 1992 [JP] Japan .................. 4-025963

[51] Int. Cl.$^5$ ............................................. G03C 1/85
[52] U.S. Cl. ................................... 430/528; 430/527; 430/536; 430/941; 430/518; 430/627; 526/307
[58] Field of Search ............ 430/527, 528, 536, 941, 430/518, 627; 526/307

[56] References Cited

U.S. PATENT DOCUMENTS

| | | | |
|---|---|---|---|
| T.955,003 | 2/1977 | Mann et al. | 96/87 A |
| 4,070,189 | 1/1978 | Kelley et al. | 430/527 |
| 4,374,924 | 2/1983 | Yokoyama et al. | 430/528 |
| 4,623,614 | 11/1986 | Masakazu et al. | 430/527 |

FOREIGN PATENT DOCUMENTS

| | | | |
|---|---|---|---|
| 0106115 | 9/1978 | Japan | 430/527 |
| 0067746 | 5/1980 | Japan | 430/527 |
| 0279853 | 12/1986 | Japan | 430/527 |
| 0129340 | 6/1991 | Japan | 430/528 |

*Primary Examiner*—Thomas R. Neville
*Attorney, Agent, or Firm*—Sughrue, Mion, Zinn, Macpeak & Seas

[57] ABSTRACT

A cationic high-molecular weight compound is represented by formula (I):

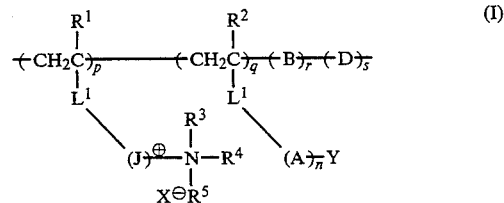

wherein $R^1$ and $R^2$ may be the same or different and each represents a hydrogen atom or $C_{1-6}$ lower alkyl group; $L^1$ represents —COO— or —CONH— and $L^2$ represents a divalent group; J represents a $C_{1-20}$ alkylene group or $C_{7-20}$ aralkylene group; $R^3$, $R^4$ and $R^5$ may be the same or different and each represents a $C_{1-20}$ alkyl group or $C_{7-20}$ aralkyl group; $X^-$ represents an anion; A represents a repeating unit made from a polymerizable monomer; n represents a number-average polymerization degree of 2 or more; Y represents a monovalent connecting group; B represents an ethylenically unsaturated monomer containing at least two ethylenically unsaturated groups or a repeating unit made from N-methylol (meth)acrylamide or N-alkylether (meth)acrylamide; D represents a repeating unit made from an ethylenically unsaturated monomer; and p, q, r and s each represents a monomer component weight percentage, with the proviso that p, q, r and s are 1 to 99% by weight, 0.5 to 70% by weight, 1 to 40% by weight and 0 to 98% by weight, respectively, and p+q+r+s=100. A silver halide photographic material contains constituent layers including at least one light-sensitive silver halide emulsion layer on a support, wherein at least one of the constituent layers contains such a cationic high-molecular weight compound.

12 Claims, No Drawings

CATIONIC HIGH-MOLECULAR WEIGHT COMPOUND

FIELD OF THE INVENTION

The present invention relates to an antistatic composition which can be synthesized in one stage in an organic solvent system and to an element obtained by the coating of such a composition, particularly a silver halide photographic material having excellent antistatic properties.

BACKGROUND OF THE INVENTION

Plastic materials have excellent electrical properties, but their surfaces tend to be electrically charged. Once electrically charged, the plastic materials can hardly leak electrical charge from their surfaces, often causing troubles at a forming step, working step or other various steps carried out until they are supplied to users as finished products.

Antistatic agents serve to cause an electrical charge to rapidly leak from the surface of plastic materials, avoiding various troubles. To this end, the plastic materials are kneaded or coated with low-molecular weight surface active agents as disclosed in "9586 Chemical Merchandise", Kagaku Kogyo Nipposha, pp. 775–776, or electrically-conductive resins, depending on usage.

The constituents of the photographic light-sensitive material are an electrically insulating support and photographic layers which often suffer from the accumulation of static charge caused by contact friction with or peeling off the surface of the same or a different kind of substance during the preparation or use of the photographic light-sensitive material. Static charge thus accumulated causes many troubles. The most serious trouble is a spot or branched feather-shaped linear mark produced by development of a photographic film which has been exposed to light on its light-sensitive emulsion layer by the discharge of accumulated static charge before development. This mark is a so-called static mark that can remarkably impair and occasionally destroy the commercial value of the photographic film. This phenomenon can be recognized only when the photographic light-sensitive material is developed and thus is a very difficult problem.

Static charge thus accumulated also causes secondary troubles. That is, static charge thus accumulated causes the photographic film to attract dust before or after processing or disables the photographic film to be uniformly coated. This is also a difficult problem.

Static marks developed on photographic light-sensitive materials by the accumulation of static charge become more remarkable as the sensitivity and processing rate of photographic light-sensitive materials increase. In particular, as photographic light-sensitive materials have recently been highly sensitized and often subjected to severe treatments such as high speed coating, high speed picture taking and high speed automatic development, they have become more susceptible to static marking. Further, as processed photographic light-sensitive materials have recently been more often treated, dust attraction can cause a serious trouble.

In order to eliminate the troubles caused by static charge, the above mentioned antistatic agents are preferably incorporated in the photographic light-sensitive material. However, antistatic agents commonly used in other fields cannot necessarily be used for photographic light-sensitive materials. Various restrictions peculiar to photographic light-sensitive materials are imposed on these antistatic agents. In other words, antistatic agents which can be used for photographic light-sensitive materials are required to exhibit excellent antistatic properties as well as to meet other requirements; that is, they must have no adverse effects on photographic properties such as sensitivity, fog, graininess and sharpness of photographic light-sensitive materials, the film strength of photographic light-sensitive materials and the resistance of photographic light-sensitive materials to adhesion, they must not accelerate the fatigue of the processing solution for photographic light-sensitive materials, they must not contaminate the conveying roller, and they must not lower the adhesive strength between the constituent layers of photographic light-sensitive materials. Thus, antistatic agents which can be used for photographic light-sensitive materials have many restrictions.

Examples of antistatic agents which have heretofore been used for photographic light-sensitive materials include ionic electrically-conductive substances, hygroscopic substances, and inorganic electrically-conductive grains. Most of these anti-static agents serve to render the light-sensitive materials electrically conductive so that the electrical charge can be rapidly leaked before the discharge of accumulated static charge.

As an approach for directly rendering the support for photographic light-sensitive materials anti-static, a method which comprises directly blending such a substance in a high molecular weight compound to be used as a support and a method which comprises coating such a substance on the surface of a support have been known. In the latter case, an antistatic agent may be coated singly or in combination with a high-molecular weight compound such as gelatin, polyvinyl alcohol, cellulose acetate, polyvinyl formal and polyvinyl butyral. Alternatively, an antistatic agent may be incorporated in a light-sensitive emulsion layer to be provided on a support or light-insensitive auxiliary layers (e.g., back layer, antihalation layer, interlayer, protective layer). Further, an antistatic agent may be coated on developed light-sensitive materials to inhibit the attraction of dust during the treatment of the developed light-sensitive materials.

Among these antistatic agents, cationic polymer compounds are particularly important for the antistatic properties. A typical example of such cationic polymer compounds include so-called ionen type polymers containing a dissociative group in their main chain as disclosed in JP-A-48-91165, JP-A-54-18728, JP-A-54-159222, JP-A-64-13542, JP-A-64-28633, JP-A-64-28634, JP-A-64-29839, JP-A-64-29840, JP-A-64-88449, JP-A-2-116843, JP-A-1-245252, and JP-A-1-245253 (the term "JP-A" as used herein means an "unexamined published Japanese patent application"), and U.S. Pat. No. 4,898,808.

Although the above mentioned ionen type polymers exhibit excellent antistatic properties, they are disadvantageous in that they are eluted with a developer to form a complex with an anionic compound eluted from an emulsion layer, causing turbidity or contamination in the developer.

As antistatic agents which eliminate these difficulties, crosslinked grains of cationic polymer as disclosed in JP-A-53-45231, JP-B-60-51693 (the term "JP-B" as used herein means an "examined Japanese patent publication"), and U.S. Pat. No. 4,070,189 have been described.

In general, the coating of an antistatic agent is often effected in an organic solvent system to lighten the drying load. Since the above-mentioned crosslinked grains cannot be synthesized in one stage in an organic solvent system, a step is required which comprises emulsion polymerization followed by a quaternarizing reaction and a changing of the medium from water to an organic solvent system. The addition of this step naturally worsens the productivity of the above-mentioned crosslinked grains.

SUMMARY OF THE INVENTION

It is therefore an object of the present invention to provide an antistatic composition which can be synthesized in one stage in an organic solvent system.

It is another object of the present invention to provide a silver halide photographic material having excellent antistatic properties which is substantially free from turbidity and contamination due to elution with a developer.

These and other objects of the present invention will become more apparent from the following detailed description and examples.

The objects of the present invention are accomplished with a cationic high-molecular weight compound represented by formula (I):

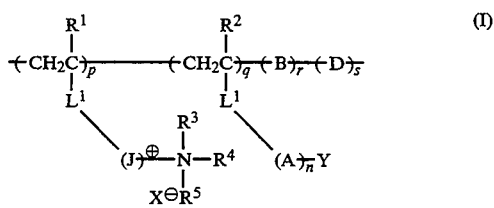

wherein $R^1$ and $R^2$ may be the same or different and each represents a hydrogen atom or $C_{1-6}$ lower alkyl group; $L^1$ represents —COO— or —CONH— and $L^2$ represents a divalent group; J represents a $C_{1-20}$ alkylene group or $C_{7-20}$ aralkylene group; $R^3$, $R^4$ and $R^5$ may be the same or different and each represents a $C_{1-20}$ alkyl group or $C_{7-20}$ aralkyl group; $X^-$ represents an anion; A represents a repeating unit made from a polymerizable monomer; n represents a number-average polymerization degree of 2 or more; Y represents a monovalent connecting group; B represents an ethylenically unsaturated monomer containing at least two ethylenically unsaturated groups or a repeating unit made from N-methylol (meth)acrylamide or N-alkylether (meth)acrylamide; D represents a repeating unit made from an ethylenically unsaturated monomer; and p, q, r and s each represents a monomer component weight percentage, with the proviso that p, q, r and s are 1 to 99% by weight, 0.5 to 70% by weight, 1 to 40% by weight and 0 to 98% by weight, respectively, and p+q+r+s=100.

DETAILED DESCRIPTION OF THE INVENTION

The compound of the present invention represented by formula (I) will be further described hereinafter.

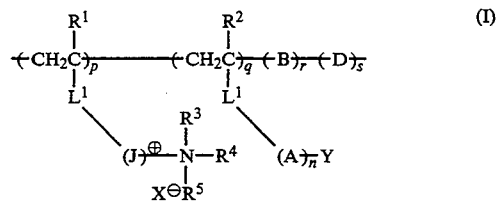

In formula (I), $R^1$ represents a hydrogen atom or $C_{1-6}$ lower alkyl group. Preferred among these groups are a hydrogen atom and methyl group. $L^1$ represents —COO— or —CONH— and $L^2$ represents a divalent group. J represents a $C_{1-20}$ alkylene group or $C_{7-20}$ aralkylene group. Preferred among these groups is a $C_{2-6}$ alkylene group.

$R^3$ $R^4$ and $R^5$ may be the same or different and each represents a $C_{1-20}$ alkyl group or $C_{7-20}$ aralkyl group. Preferred among these groups is a $C_{1-6}$ alkyl group, particularly a methyl group.

$X^-$ represents an anion, preferably $Cl^-$.

The ethylenically unsaturated monomer represented by formula (II) constituting part of the compound represented by formula (I) will be further described hereinafter. The monomer represented by formula (II) will be described later and is a constituent unit which provides dispersion-polymerized grains with dispersion stability.

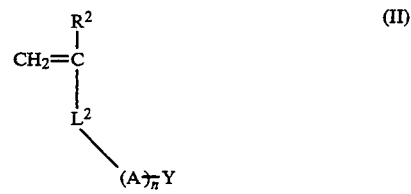

wherein $R^2$ has the same definition as $R^1$; A represents a repeating unit derived from a polymerizable monomer; and n represents a number-average polymerization degree of 2 or more.

Examples of the polymerizable monomer represented by A include ethylenically unsaturated monomers, and polycondensable or polyadditionable monomers.

Examples of ethylenically unsaturated monomers represented by A include ethylene, propylene, 1-butene, isobutene, styrene, α-methylstyrene, vinyltoluene, monoethylenically unsaturated ester of aliphatic acid (e.g., vinyl acetate, allyl acetate), ethylenically unsaturated ester of monocarboxylic or dicarboxylic acid (e.g., methyl methacrylate, ethyl acrylate, hydroxyethyl methacrylate, n-butyt acrylate, n-butyl methacrylate, n-hexyl methacrylate, n-lauryl methacrylate, benzyl methacrylate, cyclohexyl methacrylate, 2-ethylhexyl acrylate, stearyl methacrylate, perfluorooctylethyl methacrylate), monoethylenically unsaturated compounds (e.g., acrylonitrile, methacrylonitrile), and dienes (e.g., butadiene, isoprene). Preferred among these ethylenically unsaturated monomers are 2-ethylhexyl acrylate, stearyl methacrylate, styrene, methyl methacrylate, and butyl acrylate. Particularly preferred among these ethylenically unsaturated monomers is methyl methacrylate.

Examples of the polycondensable or polyadditionable monomers represented by A include monomer groups which undergo condensation reaction with dibasic acids (e.g., glutaric acid, adipic acid, pimelic acid, suberic acid, azelaic acid, sebacic acid, isocinchomeronic acid, terepthalic acid) and diamines (e.g., trimethylene diamine, tetramethylene diamine, pentamethylene diamine, hexamethylene diamine, octamethylene diamine, nonamethylene diamine, decamethylene diamine) to produce polyamides, monomer groups which undergo condensation reaction with the above-mentioned dibasic acids and diols (e.g., ethylene glycol, propylene glycol, 1,4-butanediol, 1,3-butanediol, 1,6-hexanediol, 2,5-hexanediol) to produce polyesters, monomers which undergo self-condensation reaction to produce polyesters or polyamides, such as hydroxycarboxylic acid (e.g., 12-hydroxystearic acid) and ω-amino acid (e.g., 7-aminoheptoic acid, 8-aminooctylic acid, 9-aminononanoic acid, 10-aminocapric acid, 11-aminoundecanoic acid), monomer groups which undergo polyaddition reaction with diisocyanates (e.g., trimethylene diisocyanate, tetramethylene diisocyanate, hexamethylene diisocyanate, octamethylene diisocyanate, nonamethylene diisocyanate, p-phenylene diisocyanate, 2,4-toluylene diisocyanate, isophorone diisocyanate) and the above mentioned diols to produce polyurethanes, monomer groups which undergo polyaddition reaction with the above mentioned diisocyanates and diamines to produce polyureas, monomer groups which undergo polyaddition reaction to produce polyethers, such as ethylene oxide and propylene oxide, and organochlorosilane monomer groups which undergo hydrolyzation and dehydration-polycondensation to produce silicone polymers, such as dimethyl dichlorosilane and diphenyl dichlorosilane.

Preferred among these monomer groups are the combination of azelaic acid and 1,6-hexanediol, the combination of suberic acid and ethylene glycol, ethylene oxide, and the combination of dimethyl dichlorosilane and H₂O.

$(A)_n$ may contain two or more such monomer units.

$L^2$ represents a $C_{1-20}$ divalent organic connecting group containing an ester group and/or an amido group and/or an arylene group. The specific structure of the divalent organic connecting group represented by $L^2$ is properly selected depending on the polymerization mode of A. If the monomer unit represented by A undergoes radical polymerization, the polymerization reaction is effected with a chain transfer agent containing a carboxyl group hydroxyl group, amino group or substituted amino group to introduce a functional group into the terminal of the polymer. (More preferably, an initiator containing the same functional group as contained in the chain transfer agent is used.) With these terminal functional groups as starting points, vinyl groups can be introduced into the polymer to lead to a monomer represented by formula (II).

Examples of chain transfer agents to be used include carboxyl group-containing compounds (e.g., thioglycolic acid, 3-mercaptopropionic acid, 2-iodoacetic acid, 2-mercapto-2-methylpropionic acid, thiosalicylic acid), hydroxyl group-containing compounds (e.g., 2-mercaptoethanol), and group-containing compounds (e.g., 2-mercaptoethylamine hydrochloride, N-(2-mercaptoethyl)-N-ethylamine hydrochloride). These chain transfer agents can be properly selected depending on the reactivity of the monomer represented by A. The introduction of vinyl groups into the functional group-terminated polymer thus obtained is effected as follows:

COOH-terminated polymer:
  reaction with glycidyl (meth)acrylate, vinyl ester, allyl alcohol, hydroxyethyl (meth)acrylate, etc.;

OH-terminated polymer:
  reaction with (meth)acrylic chloride, (meth)acrylic acid, vinyl isocyanate, methacryloyloxy-ethyl isocyanate, etc.;

NH₂(or —NHR)—terminated polymer:
  reaction with (meth)acrylic chloride, (meth)acrylic acid, vinyl isocyanate, etc.

These methods enable the synthesis of vinyl-terminated compounds represented by formula (II). These methods are further described in British Patent 1,096,912.

Alternatively, as mentioned in U.S. Pat. No. 3,689,593, a diisocyanate (e.g., toluylene diisocyanate) and a carboxyl group can undergo addition reaction to lead to a compound represented by formula (II).

Preferred examples of the connecting group $L^2$ in the case where $(A)_n$ is synthesized by radical polymerization include:

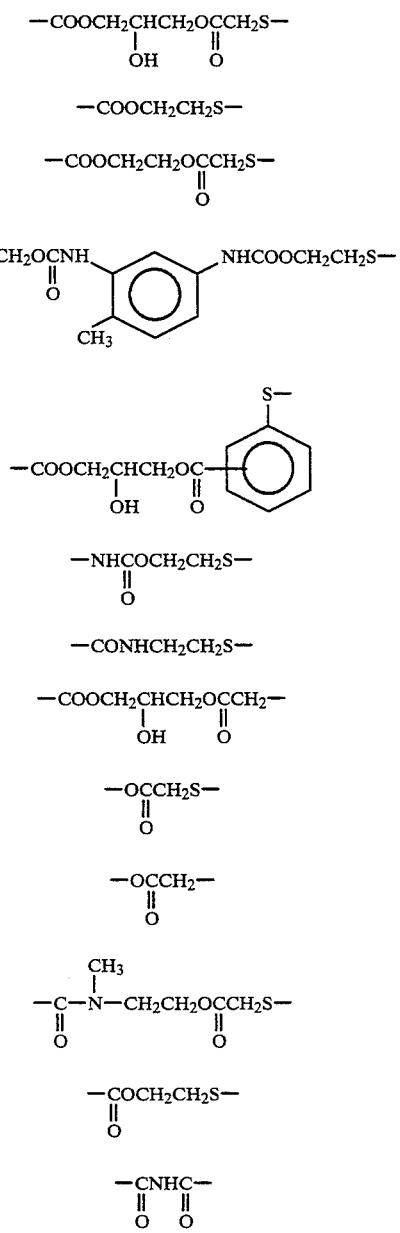

-continued

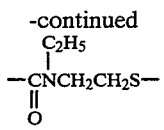

Among these the connecting group $L^2$ containing a sulfur atom is more preferred.

Preferred examples of the connecting group $L^2$ in the monomer structure represented by formula (II) obtained by polycondensation or polyaddition of A include:

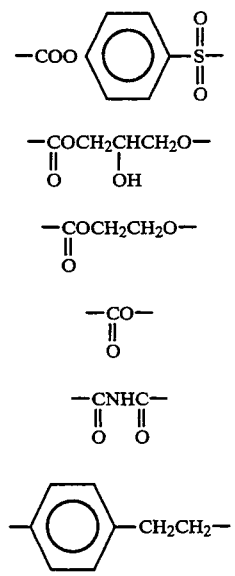

The suffix n represents an average polymerization degree of 2 or more, preferably from 2 to 1,000, more preferably from 2 to 200.

Y represents a monovalent connecting group. Y is normally a monovalent connecting group introduced into the system by polymerization initiation reaction or termination reaction. The structure of the monovalent connecting group represented by Y is properly selected depending on the polymerization mode of A. Examples of Y in the case where the monomer unit represented by A is produced by radical polymerization include a hydrogen atom and halogen atom (e.g., chlorine, iodine). On the other hand, examples of Y in the case where A is obtained by polycondensation or polyaddition include a hydrogen atom, a halogen atom, an alkyl group, monomer residue to be subjected to polycondensation or polyaddition (e.g., $-CO(CH_2)_4COOH$), and a small amount of impurities contained in the monomer (e.g., $-COC_{15}H_{31}$).

The compound represented by formula (II) is generally referred to as "macromonomer" or "macromer". Such a macromonomer or macromer is further described in Yuya Yamashita, "Nihon Secchaku Kyoukaishi (Journal of Japan Adhesive Association)", vol. 17, page 371, 1981, Yuji Kawakami and Yuya Yamashita, "Kagaku (Chemistry)", vol. 37, page 20, 1982, Y. Yamashita et al., "Macromolecules", vol. 13, page 216, 1980, Kawakami et al., "Journal of Polymer Science", Polymer Letter Edition, vol. 19, page 629, 1981, R. Asami et al., "Polymer Bulletin", vol. 2, page 713, 1980, Kawakami et al., "Polymer Journal", vol. 14, page 913, 1982, Mitadori, Tsuruta, "Die Makromolecular Chemie", vol. 180, page 1877, 1979, M. Maeda et al., "Die Makro-molecular Chemie", Rapid Communication, vol. 2, page 537, 1981, Percec et al., "Polymer Bulletin", vol. 10, page 215, 1983, and Yuya Yamashita, "Chemistry and Industry of Macromonomer", I.P.C., 1980.

B represents an ethylenically unsaturated monomer containing at least two ethylenically unsaturated groups or a repeating unit derived from N-methylol (meth)acrylamide or N-alkylether (meth)acrylamide. B is a structural unit which renders the compound of the present invention resistant to elution with a processing solution.

Preferred examples of ethylenically unsaturated monomers providing the repeating unit represented by B include divinylbenzene, allyl acrylate, allyl methacrylate, N-allyl methacrylamide, 4,4'-isopropylidene diphenylene diacrylate, 1,3-butylene diacrylate, 1,3-butylene dimethacrylate, 1,4-cyclohexylene dimethylene dimethacrylate, diethylene glycol dimethacrylate, diisopropylidene glycol dimethacrylate, divinyloxymethane, ethylene glycol diacrylate, ethylene glycol dimethacrylate, ethylidene diacrylate, ethylidene dimethacrylate, 1,6-diacrylamide hexane, 6-hexamethylene diacrylate, 1,6-hexamethylene dimethacrylate, N,N'-methylene bisacrylamide, N,N',-(1,2-dihydroxy)ethylenebisacrylamide, 2,2-dimethyl-1,3-trimethylenedimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, pentaerythritol triacrylate, trimethylol propane triacrylate, tetramethylolmethane tetraacrylate, triethylene glycol dimethacrylate, 1,3,5-triacryloylhexahydro-s-triazine, bisacrylamidoacetic acid, ethylidene trimethacrylate, propylidene triacrylate, vinylallyloxy acetate, vinyl methacrylate, 1-vinyloxy-2-allyloxyethane, N-methylolacrylamide N-methylolmethacrylamide , N-butoxymethylacrylamide and N-butoxymethylmethacrylamide.

Preferred among these ethylenically unsaturated monomers are N,N'-methylenebisacrylamide, ethylene glycol dimethacrylate, N-methylolacrylamide, and N-butoxymethyl acrylamide. Particularly preferred among these ethylenically unsaturated monomers are N-methylol acrylamide.

In the case where B is N-methylolacrylamide, curing is preferably effected with a proper catalyst such as sulfuric acid and p-toluenesulfonic acid after polymerization.

Preferred examples of the ethylenically unsaturated monomer providing the repeating unit represented by D include esters or amides derived from acrylic acids or α-alkylacrylic acids (e.g., methacrylic acid), such as acrylamide, methacrylamide, N,N'-dimethylacrylamide, N-methylacrylamide, N-isopropylacrylamide, N-methylmorpholine, N-methylpyrrolidone, n-butylacrylamide, t-butylacrylamide, diacetone acrylamide, methyl acrylate, ethyl acrylate, n-propyl acrylate, n-butyl acrylate, t-butyl acrylate, iso-butyl acrylate, methyl methacrylate, ethyl methacrylate, n-butyl methacrylate, cyclohexyl methacrylate, 2-hydroxyethyl acrylate, 2-hydroxyethyl methacrylate, 2-methoxyethyl acrylate, 2-methoxyethyl methacrylate, 2-ethoxyethyl acrylate, 2-ethoxyethyl methacrylate, 2-butoxyethyl acrylate, 2-n-propyloxyethyl methacrylate, 2-(2-methoxy)ethoxyethyl acrylate, vinylester (e.g., vinyl acetate), acrylonitrile, methacrylonitrile, dienes (e.g., butadiene, isoprene), aromatic vinyl compounds (e.g., styrene), vinylidene chloride, vinyl alkyl ether (e.g., vinyl ethyl ether), ethylene, propylene, 1-butene, and isobutene. However, the present invention is not limited to these compounds.

The ethylenically unsaturated monomer represented by D may comprise one or more kinds of copolymer components.

The suffixes p, q, r and s each represents a monomer component weight percentage, with the proviso that p, q, r and s are 1 to 99% by weight, 0.5 to 70% by weight, 1 to 40% by weight, and 0 to 98% by weight, preferably 50 to 99% by weight, 1 to 30% by weight, 1 to 20% by weight, and 0 to 20% by weight, respectively, and p+q+r+s=100. Also, s can range from 0.1 to 98% by weight, preferably 0.1 to 20% by weight.

Preferred examples of the compound represented by formula (I) of the present invention will be given below, but the present invention should not be construed as being limited thereto. (The content is represented in weight percentage.)

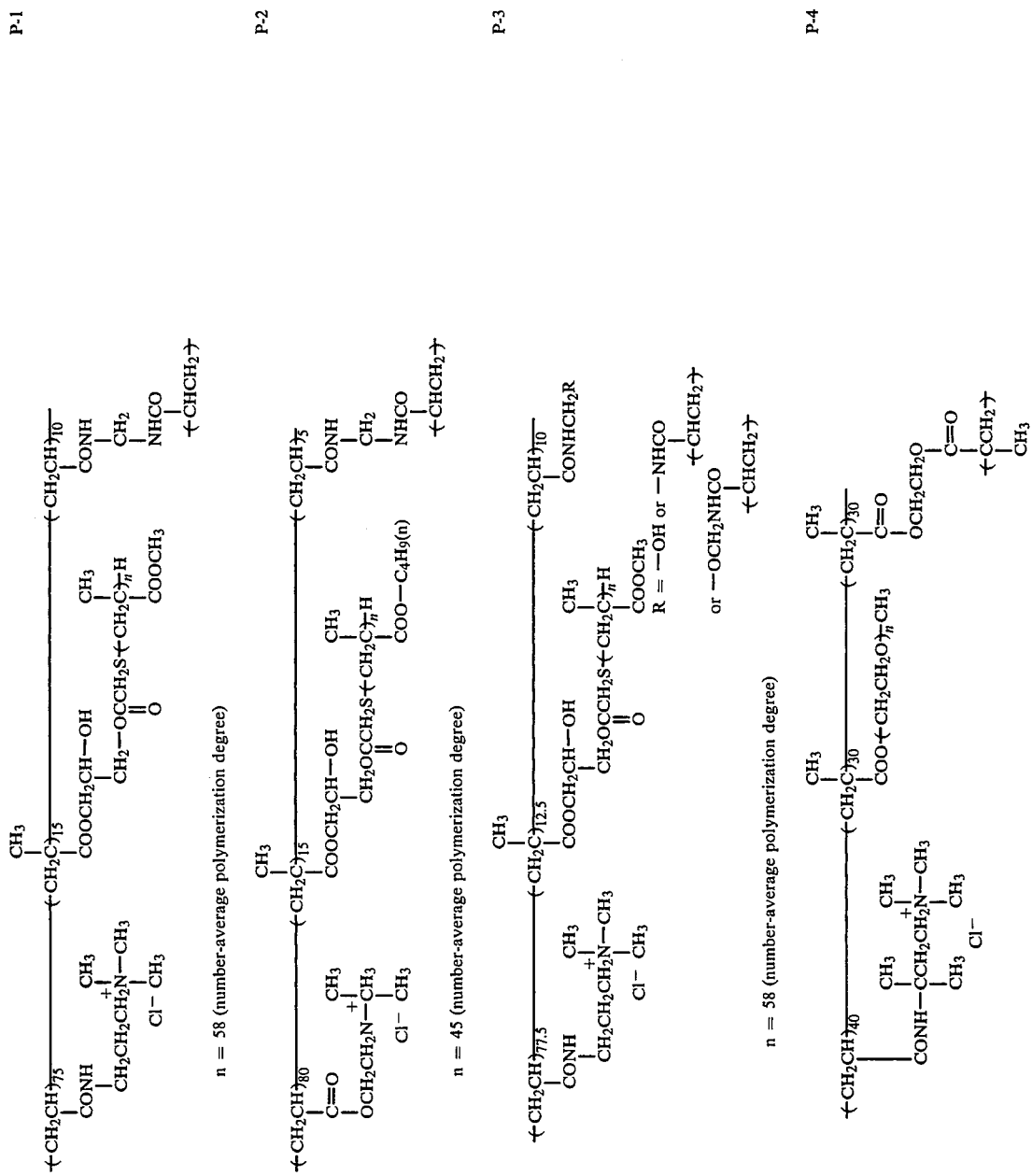

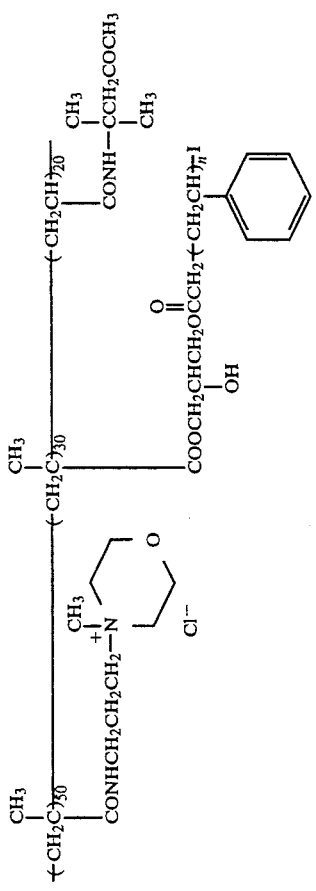
P-5
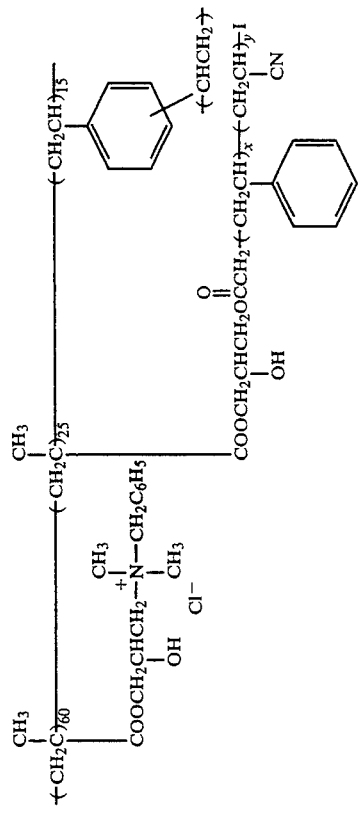
P-6
x/y = 75/25 (weight proportion)
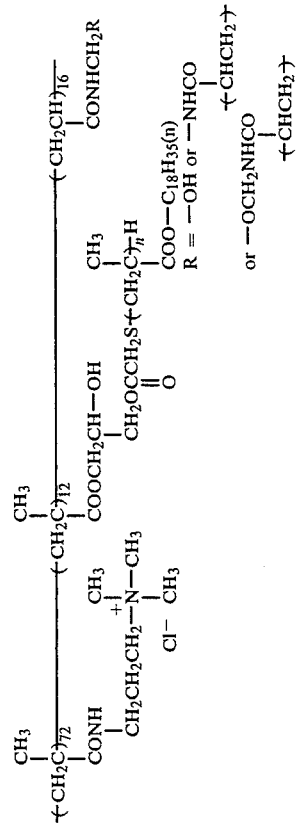
P-7

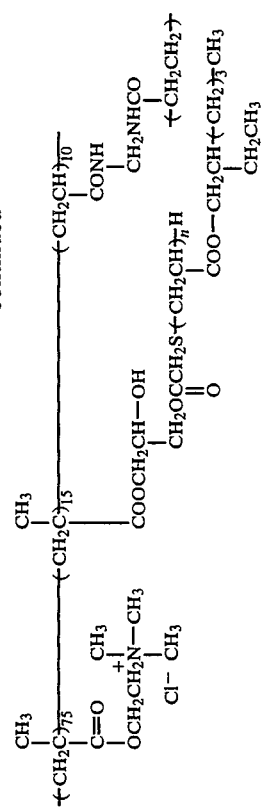
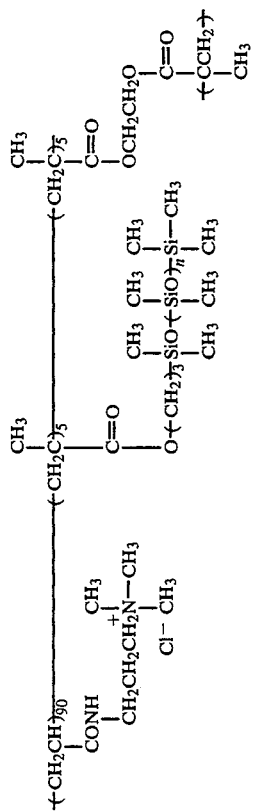
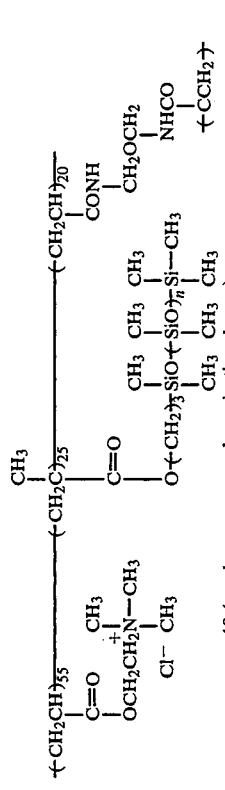
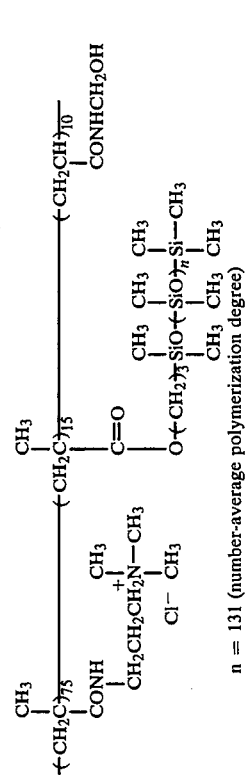

-continued
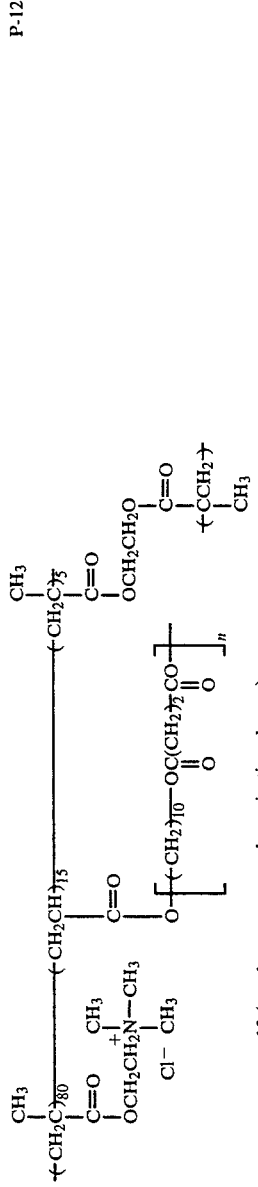
P-12
n = 15 (number-average polymerization degree)
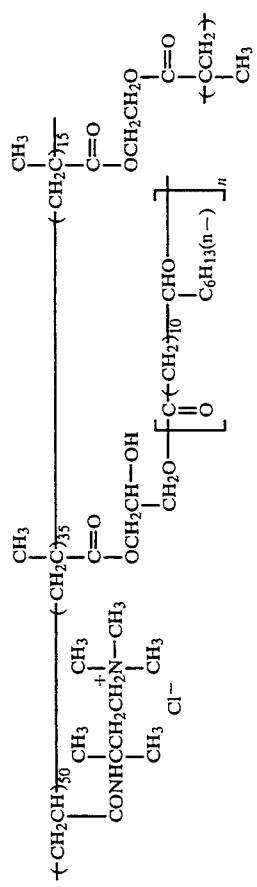
P-13
n = 10 (number-average polymerization degree)
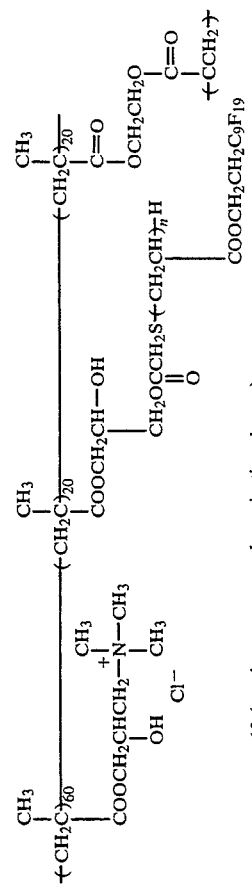
P-14
n = 12 (number-average polymerization degree)
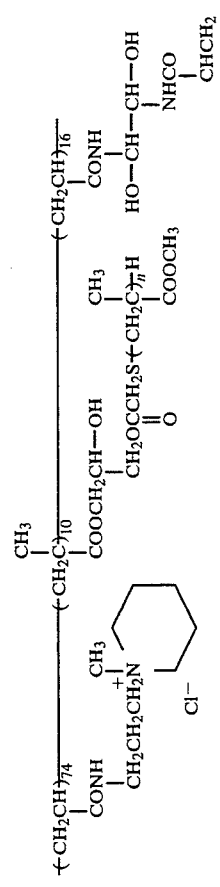
P-15
n = 9 (number-average polymerization degree)

-continued
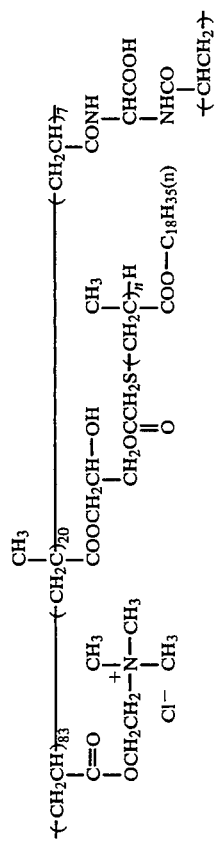
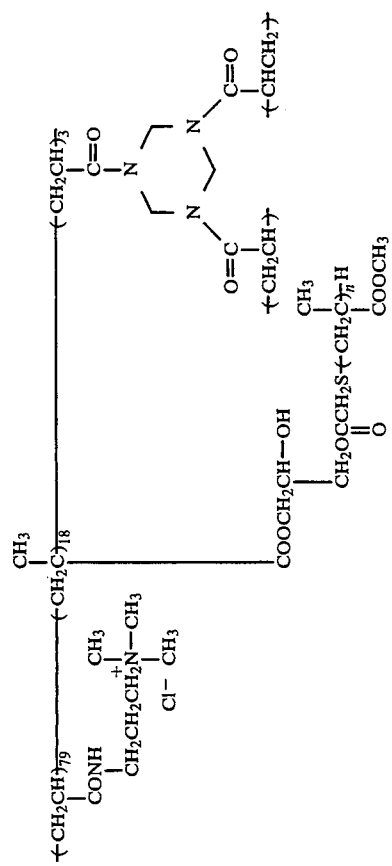
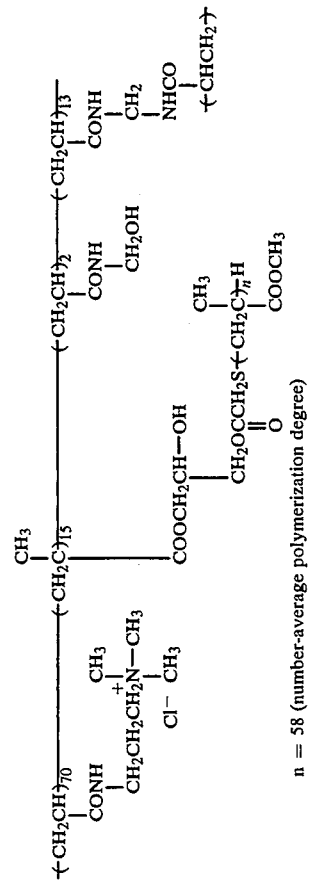

P-19
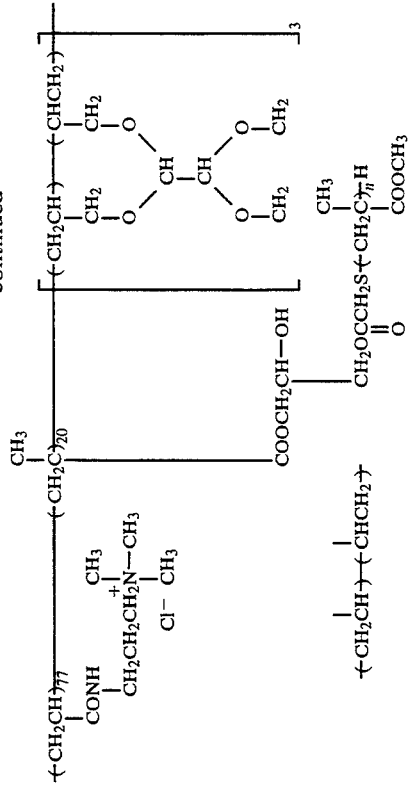
n = 119 (number-average polymerization degree)
P-20
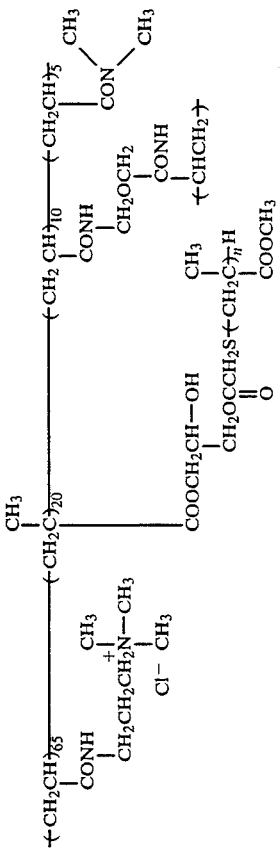
n = 58 (number-average polymerization degree)

P-11 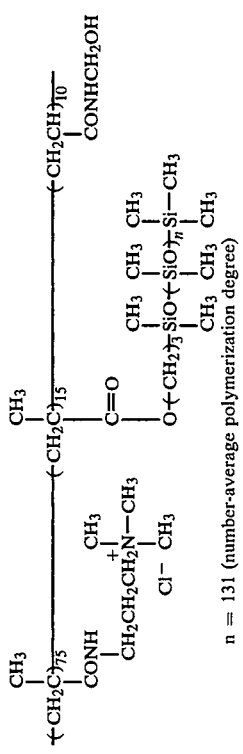
P-12 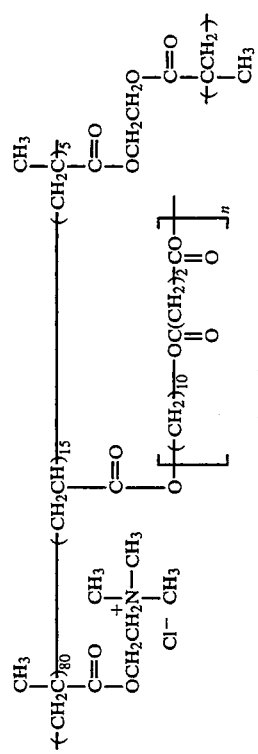
P-13 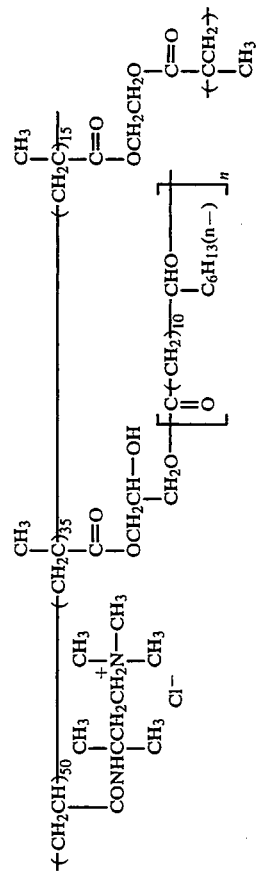
P-14 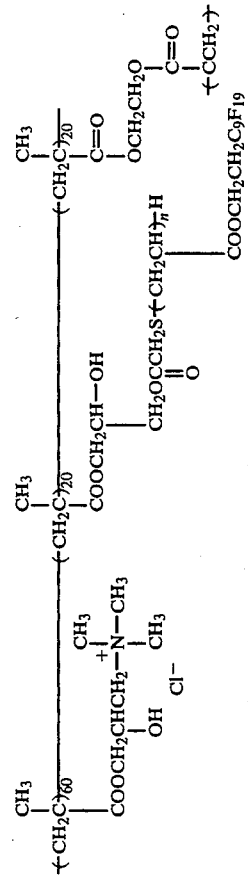

-continued
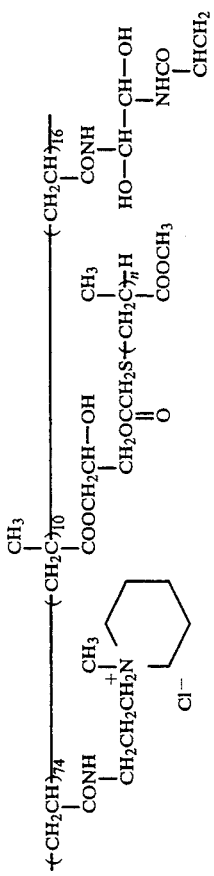 P-15
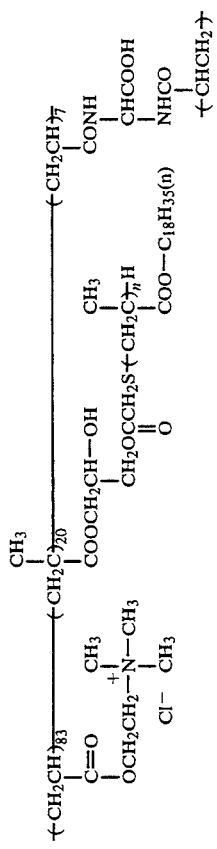 P-16
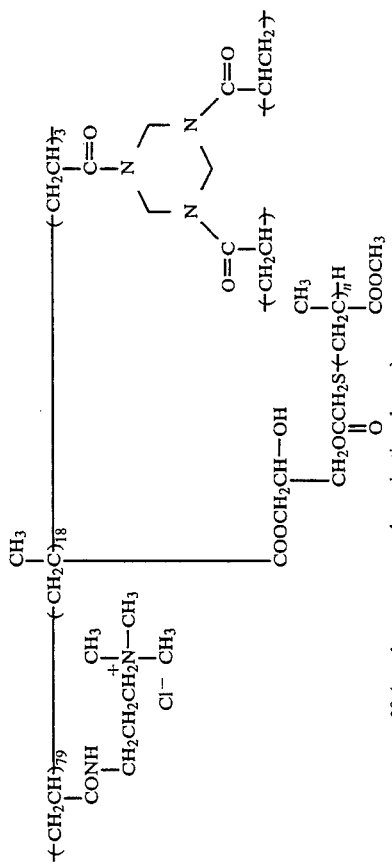 P-17

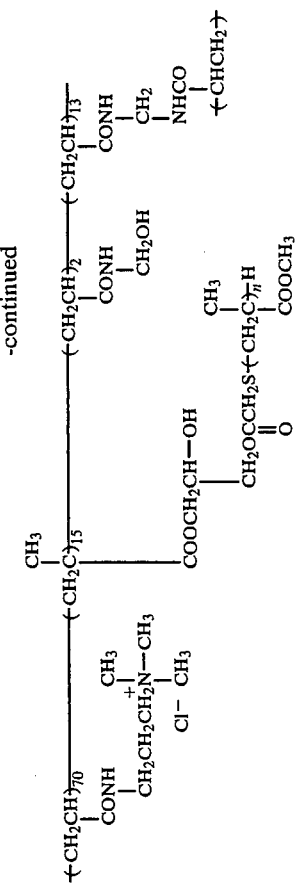
P-18
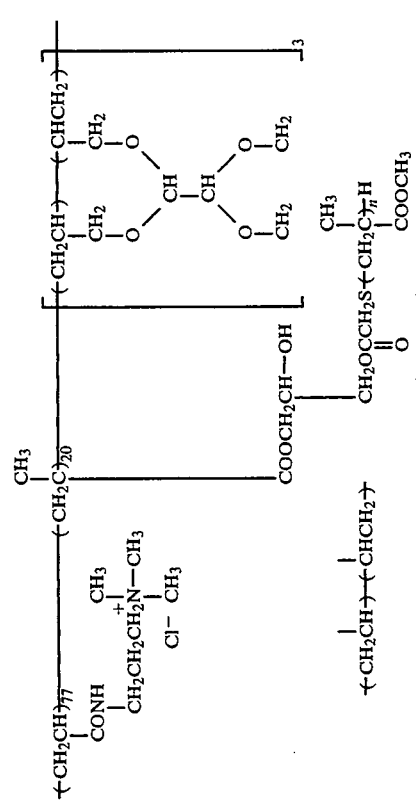
P-19
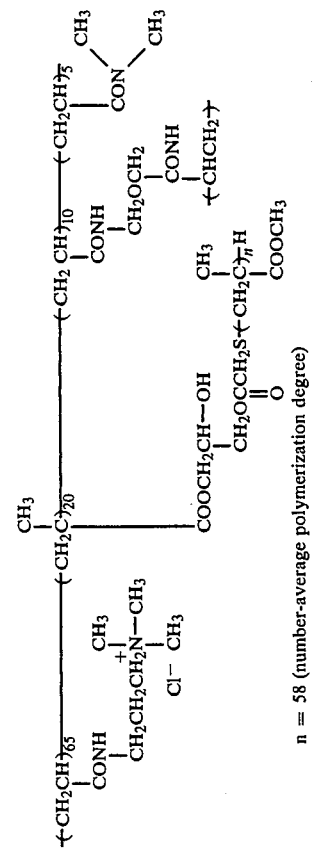
P-20

The compound of the present invention can be synthesized by any ordinary high molecular weight compound synthesis method such as emulsion polymerization and solution polymerization. It is particularly recommended that dispersion polymerization method be used for the purpose of synthesizing the compound of the present invention in one stage in an organic solvent system.

For the dispersion polymerization, preparation methods and properties are further described in Barret and Keith, "Dispersion Polymerization in Organic Media" (JOHN WILEY & SONS).

As the organic solvent to be used in the preparation of the compound of the present invention, any solvent common to the starting material of copolymer monomers may be used. Examples of such a solvent include alcohols such as 1-methoxy-2-propanol, ethylene glycol, ethanol and butanol, solvents such as N,N'-dimethylformamide, N,N'-dimethylacetamide, dimethyl sulfoxide, dioxane, acetonitrile, ethyl acetate and methyl ethyl ketone, and mixtures thereof. In the cationic high-molecular weight compound of the present invention, the simultaneous production of a diffusive component undesirably increases the elutability with a processing solution and thus should be suppressed as much as possible. To this end, it is desirable to hydrophobicize the solvent system while keeping the dissolving power of the solvent with respect to the monomer to some degree. Since a finer grain dispersion exhibits better antistatic properties, the polymerization solvent to be used in the present invention is particularly preferably an ethyl acetate/1-methoxy-2-propanol mixed solvent system having an ethyl acetate content of 50 vol % or more.

In the preparation of the compound of the present invention, the monomer may be charged collectively into the system or may be gradually dropwise added to the system. If necessary, seed polymerization may be conducted. In order to avoid the production of agglomerates during polymerization, the monomer is preferably dropwise added to the system over several hours.

However, macromonomers are preferably added collectively to the system before polymerization rather than dropwise added to the system to obtain fine and stable grains.

In the preparation of the compound of the present invention, if N-methylol(meth)acrylamide is used, polymerization is preferably followed by curing reaction with an acid catalyst. Examples of such an acid catalyst include sulfuric acid, hydrochloric acid, acetic acid, and p-toluenesulfonic acid. Preferred among these acid catalysts is sulfuric acid. The curing may be further followed by the neutralization of the polymerization system.

In the polymerization of the compound of the present invention, the preferred reaction temperature range is from 20° C. to 150° C., more preferably from 40° C. to 120° C. and the preferred reaction time is from 0.5 hour to 30 hours. If the curing reaction is conducted, the reaction temperature and time are the same as above.

In a cationic high-molecular weight compound of the present invention, the dispersion-polymerized grain has preferably an average grain diameter of 0.25 μm or less.

SYNTHESIS EXAMPLE (Synthesis of Compound P-3)

948 ml of ethyl acetate, 222 ml of 1-methoxy-2propanol and 45 g of an MMA type macromonomer (AA-6 produced by Toa Gosei Chemical Industry Co., Ltd.) were charged into a 2-l three-necked flask equipped with an agitator, a reflux condenser, a thermometer and a gas tube where they were then heated in a stream of nitrogen over a hot water bath. When the macromonomer was uniformly dissolved in the solvents and the internal temperature of the flask reached 72° C., an initiator solution obtained by dissolving 3.6 g of dimethyl-2,2'-azobisisobutyrate in 60 ml of ethyl acetate was added to the system. A uniform mixture of a solution obtained by dissolving 36 g of N-methylolacrylamide in 90 ml of 1-methoxy-2-propanol at an elevated temperature and a solution of 372.5 g of a 75% aqueous solution of a quaternary salt of N,N-dimethylaminopropylacrylamide (DMAPAA-Q, produced by Kohjin Co., Ltd.) was immediately added gradually dropwise to the system at a constant rate over 3 hours. After the dropwise addition of the monomer was completed, the system was stirred at a temperature of 72° C. for 2 hours to complete the polymerization. The system was further stirred with 1.0 g of sulfuric acid for 2 hours to effect curing reaction. The system was then cooled. The contents of the flask were then filtered. (Yield: 1,508 g; polymer solid content concentration: 23.7 wt %; dispersion grain diameter: 117 nm ( as determined in ethyl acetate by means of a coal tar counter N4 ); $Cl^{-1}$ content: 3.69 mM/g (solid content)).

The present photographic light-sensitive material can comprise at least one blue-sensitive layer, at least one green-sensitive layer and at least one red-sensitive layer on a support. The number of silver halide emulsion layers and light-insensitive layers and the order of arrangement of these layers are not specifically limited. In a typical embodiment, the present silver halide photographic material comprises light-sensitive layers consisting of a plurality of silver halide emulsion layers having substantially the same color sensitivity and different light sensitivities on a support. The light-sensitive layers are unit light-sensitive layers having a color sensitivity to any of blue light, green light and red light. In the multi-layer silver halide color photographic material, these unit light-sensitive layers are normally arranged in the order of red-sensitive layer, green-sensitive layer and blue-sensitive layer as viewed from the support. However, the order of arrangement can be optionally reversed depending on the purpose of application. Alternatively, two unit light-sensitive layers having the same color sensitivity can be arranged with a unit light-sensitive layer having a different color sensitivity interposed therebetween.

Light-insensitive layers such as various inter-layers can be provided between these silver halide light-sensitive layers and on the uppermost layer and lowermost layer.

These interlayers can comprise couplers, DIR compounds or the like as described in JP-A-61-43748, JP-A-59-113438, JP-A-59-113440, JP-A-61-20037 and JP-A-61-20038. These interlayers can further comprise a color stain inhibitor as commonly used.

The plurality of silver halide emulsion layers constituting each unit light-sensitive layer can be preferably in a two-layer structure, i.e., a high sensitivity emulsion layer and low sensitivity emulsion layer, as described in West German Patent 1,121,470 and British Patent 923,045. In general, these layers are preferably arranged in such an order that the light sensitivity becomes lower towards the support. Furthermore, a light-insensitive layer can be provided between these silver halide emulsion layers. As described in JP-A-57-112751, JP-A-62-200350, JP-A-62-206541, and JP-A-62-206543, a low sensitivity emulsion layer can be provided remote from the support, while a high sensitivity emulsion layer can be provided nearer to the support.

In an embodiment of such an arrangement, a low sensitivity blue-sensitive layer (BL), a high sensitivity blue-sensitive layer (BH), a high sensitivity green-sensitive layer (GH), a low sensitivity green-sensitive layer (GL), a high sensitivity red-sensitive layer (RH), and a low sensitivity red-sensitive layer (RL) can be arranged in this order going toward the support. In another embodiment, BH, BL, GL, GH, RH, and RL can be arranged in this order going toward the support. In a further embodiment, BH, BL, GH, GL, RL, and RH can be arranged in this order going toward the support.

As described in JP-B-55-34932, blue-sensitive layer, GH, RH, GL, and RL can be arranged in this order going toward the support. Alternatively, as described in JP-A-56-25738 and JP-A-62-63936, a blue-sensitive layer, GL, RL, GH, and RH can be arranged in this order going toward the support.

As described in JP-B-49-15495, a layer arrangement can be used such that the uppermost layer is a silver halide emulsion layer having the highest sensitivity, the middle layer is a silver halide emulsion layer having a lower sensitivity, and the lowermost layer is a silver halide emulsion layer having a lower sensitivity than that of the middle layer. In such a layer arrangement, the light sensitivity becomes lower towards the support. Even if the layer structure comprises three layers having different light sensitivities, a middle sensitivity emulsion layer, a high sensitivity emulsion layer and a low sensitivity emulsion layer can be arranged in this order going toward the support in a color-sensitive layer as described in JP-A-59-202464.

Alternatively, a high sensitivity emulsion layer, a low sensitivity emulsion layer and a middle sensitivity emulsion layer or a low sensitivity emulsion layer, a middle sensitivity emulsion layer and a high sensitivity emulsion layer may be arranged in this order going toward the support. In the case of a four-layer structure, the arrangement of layers may be similarly altered.

In order to improve color reproducibility, a donor layer (CL) having an interimage effect and a different spectral sensitivity distribution from the main light-sensitive layers such as BL, GL and RL may be provided adjacent or close to these main layers as described in U.S. Pat. Nos. 4,663,271, 4,705,744, and 4,707,436, and JP-A-62-160448 and JP-A-63-89580.

As described above, various layer structures and arrangements can be selected depending on the purpose of light-sensitive material.

A suitable silver halide to be incorporated in the photographic emulsion layer in the photographic light-sensitive material to be used in the present invention is silver iodobromide, silver iodochloride or silver iodochlorobromide containing silver iodide in an amount of about 30 mole % or less. Particularly suitable is silver iodobromide containing silver iodide in an amount of about 2 mole % to about 10 mole %.

Silver halide grains in the present invention may be so-called regular grains having a regular crystal form, such as a cube, octahedron and tetradecahedron, or those having an irregular crystal form such as a sphere and tablet, those having a crystal defect such as a twinning plane, or those having a combination of these crystal forms.

The silver halide grains may be either fine grains of about 0.2 $\mu$m or smaller in diameter or giant grains having a projected area diameter of up to about 10 $\mu$m. The emulsion may be either a monodisperse emulsion or a polydisperse emulsion.

The preparation of the silver halide photographic emulsion which can be used in the present invention can be accomplished by any suitable method as described in Research Disclosure No. 17643 (December, 1978), pp. 22–23, "I. Emulsion Preparation and Types", No. 18716 (November, 1979), page 648, and No. 307105 (November, 1989), pp. 863–865, Glafkides, "Chimie et Physique Photographique", Paul Montel (1967), G. F. Duffin, "Photographic Emulsion Chemistry", Focal Press, 1966, and V. L. Zelikman et al., "Making and Coating Photographic Emulsions", Focal Press, 1964.

Furthermore, monodisperse emulsions as described in U.S. Pat. Nos. 3,574,628 and 3,655,394, and British Patent 1,413,748 can be preferably used in the present invention.

Tablet grains having an aspect ratio of about 3 or more can be used in the present invention. The preparation of such tablet grains can be easily accomplished by any suitable method as described in Gutoff, "Photographic Science and Engineering", vol. 14, pp. 248–257, 1970, U.S. Pat. Nos. 4,434,226, 4,414,310, 4,433,048, and 4,439,520, and British Patent 2,112,157.

The individual silver halide crystals may have either a homogeneous structure or a heterogeneous structure composed of a core and an outer shell differing in halogen composition, or they may have a layered structure. Furthermore, the grains may have fused thereto a silver halide having a different halogen composition or a compound other than silver halide, e.g., silver thiocyanate, lead oxide, etc., by an epitaxial junction. Mixtures of grains having various crystal forms may also be used.

The above-mentioned emulsion may be of the surface latent image type, in which latent images are mainly formed on the surface of grains, or the internal latent image type, in which latent images are mainly formed inside grains, or the type in which latent images are formed both on the surface and inside grains. If the emulsion is of the internal latent image type, it may be a core/shell type internal latent image emulsion as disclosed in JP-A-63-264740. A process for the preparation of such a core/shell type internal latent image emulsion is described in JP-A-59-133542. In this emulsion, the thickness of the shell depends on the development process, etc., and is preferably in the range of 3 to 40 nm, particularly 5 to 20 nm.

The silver halide emulsion to be used in the present invention is normally subjected to physical ripening, chemical ripening and spectral sensitization. Additives to be used in these steps are described in Research Disclosure Nos. 17643, 18716, 307105 as tabulated below.

In the light-sensitive material of the present invention, two or more kinds of light-sensitive halide emulsions which are different in at least one of grain size, grain size distribution, halogen composition, grain shape and sensitivity may be incorporated in the same layer in admixture.

Surface-fogged silver halide grains as described in U.S. Pat. No. 4,082,553, internally-fogged silver halide grains as described in U.S. Pat. No. 4,626,498 and JP-A-59-21485 or colloidal silver may be preferably incorporated in a light-sensitive silver halide emulsion layer and/or substantially light-insensitive hydrophilic colloidal layer. The term "internally- or surface-fogged silver halide grains" as used herein means "silver halide grains which can be uniformly (nonimagewise) developed, regardless of whether they were present in the exposed portion or unexposed portion on the light-sensitive material". Processes for the preparation of internally- or surface-fogged silver halide grains are described in U.S. Pat. No. 4,626,498, and JP-A-59-214852.

Silver halides forming the core of internally-fogged core/shell type silver halide grains may have the same or different halogen compositions. Internally- or surface-fogged silver halide grains may comprise any of silver chloride, silver chlorobromide, silver iodobromide and silver chloroiodobromide. The size of these fogged silver halide grains is not specifically limited, and its average grain size is preferably in the range of 0.01 to 0.75 μm, particularly 0.05 to 0.6 μm. The crystal form of these grains is not specifically limited and may be regular. These emulsions may be polydisperse but are preferably monodisperse (silver halide grains at least 95% by weight or number of which are those having grain diameters falling within ±40% from the average grain size).

In the present invention, light-insensitive finely divided silver halide grains are preferably used. Light-insensitive finely divided silver halide grains are silver halide grains which are not exposed to light upon imagewise exposure for taking of dye images so that they are not substantially developed in the development process. Preferably, these silver halide grains are not previously fogged.

These finely divided silver halide grains have a silver bromide content of 0 to 100 mole % and may optionally contain silver chloride and/or silver iodide, preferably 0.5 to 10 mole % of silver iodide.

These finely divided silver halide grains preferably have an average diameter of 0.01 to 0.5 μm, more preferably 0.02 to 0.2 μm as calculated in terms of the diameter of the circle having the same area as the projected area of grain.

These finely divided silver halide grains can be prepared in the same manner as ordinary light-sensitive silver halide. In this case, the surface of the silver halide grains needs to be neither optically nor spectrally sensitized. However, prior to the addition of the emulsion to a coating solution, a known stabilizer such as triazole, azaindene, benzothiazolium or a mercapto compound and a zinc compound is preferably added to the emulsion. Colloidal silver is preferably incorporated in the layer containing these finely divided silver halide grains.

The coated amount of silver in the light-sensitive material of the present invention is preferably in the range of 6.0 g/m² or less, most preferably 4.5 g/m² or less.

Known photographic additives which can be used in the present invention are also described in the above cited three Research Disclosures as tabulated below.

| Kind of additive | RD17643 | RD18716 | RD307105 |
|---|---|---|---|
| 1. Chemical sensitizer | p. 23 | p. 648 right column (RC) | p. 866 |
| 2. Sensitivity increasing agent | | p. 648 right column (RC) | |
| 3. Spectral sensitizer and supersensitizer | pp. 23–24 | p. 648 RC– p. 649 RC | pp. 866–868 |
| 4. Brightening agent | p. 24 | p. 647 RC | p. 868 |
| 5. Antifoggant and stabilizer | pp. 24–25 | p. 649 RC | pp. 868–870 |
| 6. Light absorbent, filter dye, and ultraviolet absorbent | pp. 25–26 | p. 649 RC– p. 650 left column (LC) | p. 873 |
| 7. Stain inhibitor | p. 25 RC | p. 650 LC–RC | p. 872 |
| 8. Dye image stabilizer | p. 25 | p. 650 LC | " |
| 9. Hardening agent | p. 26 | p. 651 LC | pp. 874–875 |
| 10. Binder | p. 26 | p. 651 LC | pp. 873–874 |
| 11. Plasticizer and lubricant | p. 27 | p. 650 RC | p. 876 |
| 12. Coating aid and surface active agent | pp. 26–27 | " | pp. 875–876 |
| 13. Antistatic agent | p. 27 | " | pp. 876–877 |
| 14. Matting agent | | | pp. 878–879 |

In order to inhibit deterioration in photographic properties due to formaldehyde gas, a compound capable of reacting with and solidifying formaldehyde as disclosed in U.S. Pat. Nos. 4,411,987 and 4,435,503 can be incorporated in the light-sensitive material.

The light-sensitive material of the present invention preferably comprises a mercapto compound as disclosed in U.S. Pat. Nos. 4,740,454 and 4,788,132, JP-A-62-18539, and JP-A-1-283551.

The light-sensitive material of the present invention preferably comprises a fogging agent, a development accelerator, a silver halide solvent or a compound for releasing precursors thereof as disclosed in JP-A-1-106052, regardless of the amount of developed silver produced by development.

The light-sensitive material of the present invention preferably comprises a dye which has been dispersed by a method as disclosed in International Patent Disclosure WO88/04794 and JP-A-1-502912 or a dye as disclosed in EP-A-317308, U.S. Pat. No. 4,420,555, and JP-A-1-259358.

The light-sensitive material to be processed in the present invention can comprise various color couplers. Specific examples of the color couplers are described in the patents described in the above-cited Research Disclosure No. 17643, VII-C to G, and No. 307105, VII-C to G.

Preferred yellow couplers include those described in U.S. Pat. Nos. 3,933,501, 4,022,620, 4,326,024, 4,401,752, 4,248,961, 3,973,968, 4,314,023, and 4,511,649, JP-B-58-10739, British Patents 1,425,020 and 1,476,760, and EP-A-249473.

Preferred magenta couplers include 5-pyrazolone compounds and pyrazoloazole compounds. Particularly preferred are those described in U.S. Pat. Nos. 4,310,619, 4,351,897, 3,061,432, 3,725,067, 4,500,630, 4,540,654, and 4,556,630, European Patent 73,636, JP-A-60-33552, JP-A-60-43659, JP-A-61-72238, JP-A-60-35730, JP-A-55-118034, and JP-A-60-185951, RD Nos. 24220 (June, 1984) and 24230 (June, 1984), and WO88/04795.

Cyan couplers include naphthol and phenol couplers. Preferred are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011, 4,327,173, 3,446,622, 4,333,999, 4,775,616, 4,451,559, 4,427,767, 4,690,889, 4,254,212, and 4,296,199, West German Patent Disclosure No. 3,329,729, EP-A-121365, EP-A-249453, and JP-A-61-42658. Further, pyrazoloazole couplers as disclosed in JP-A-64-553, JP-A-64-554, JP-A-64-555, and JP-A-64-556 and imidazole couplers as disclosed in U.S. Pat. No. 4,818,672 can be used.

Typical examples of polymerized dye-forming couplers are described in U.S. Pat. Nos. 3,451,820, 4,080,211, 4,367,282, 4,409,320, and 4,576,910, British Patent 2,102,173, and EP-A-341188.

Couplers which form a dye having moderate diffusibility preferably include those described in U.S. Pat. No. 4,366,237, British Patent 2,125,570, European Patent 96,570, and West German Patent Disclosure No. 3,234,533.

Colored couplers for the correction of unnecessary absorptions of the developed dye preferably include those described in Research Disclosure No. 17643, VII-G, Research Disclosure No. 307105, VII-G, U.S. Pat. Nos. 4,163,670, 4,004,929, and 4,138,258, JP-B-57-39413, and British Patent 1,146,368. Furthermore, couplers for the correction of unnecessary absorption of the developed dye by a fluorescent dye released upon coupling as described in U.S. Pat. No. 4,774,181 and couplers containing as a separatable group a dye precursor group capable of reacting with a developing agent to form a dye as described in U.S. Pat. No. 4,777,120 can be preferably used.

Compounds capable of releasing a photographically useful residue upon coupling can also be used in the present invention. Preferred examples of DIR couplers which release a development inhibitor are described in the patents cited in RD No. 17643, VII-F and RD No. 307105, VII-F, JP-A-57-151944, JP-A-57-154234, JP-A-60-184248, JP-A-63-37346, and JP-A-63-37350, and U.S. Pat. Nos. 4,248,962, and 4,782,012.

Bleach accelerator-releasing couplers as disclosed in RD Nos. 11449 and 24241 and JP-A-61-201247 are effective for reducing the time required for processing step having bleaching capability. In particular, when incorporated in a light-sensitive material comprising the above mentioned tablet silver halide grains, these couplers exhibit their maximum effect.

Couplers capable of imagewise releasing a nucleating agent or a developing accelerator at the time of development preferably include those described in British Patents 2,097,140 and 2,131,188, JP-A-59-157638 and JP-A-59-170840. Further, compounds which undergo redox reaction with the oxidation product of a developing agent to release a fogging agent, a development accelerator, a silver halide solvent or the like as disclosed in JP-A-60-107029, JP-A-60-252340, JP-A-1-44940, and JP-A-1-45687 are preferred.

In addition to the foregoing couplers, the photographic material according to the present invention can further comprise competing couplers as described in U.S. Pat. No. 4,130,427, polyequivalent couplers as described in U.S. Pat. Nos. 4,283,472, 4,338,393, and 4,310,618, DIR redox compound releasing couplers, DIR coupler releasing couplers, DIR coupler releasing redox compounds or DIR redox releasing redox compounds as described in JP-A-60-185950 and JP-A-62-24252, couplers capable of releasing a dye which returns to its original color after release as described in EP-A-173302 and EP-A-313308, couplers capable of releasing a ligand as described in U.S. Pat. No. 4,555,477, couplers capable of releasing a leuco dye as described in JP-A-63-75747, and couplers capable of releasing a fluorescent dye as described in U.S. Pat. No. 4,774,181.

The incorporation of the couplers of the present invention in the light-sensitive material can be accomplished by any suitable known dispersion method.

Examples of high boiling solvents to be used in the oil-in-water dispersion process are described in U.S. Pat. No. 2,322,027. Specific examples of high boiling organic solvents having a boiling point of 175° C. or higher at normal pressure which can be used in the oil-in-water dispersion process include phthalic esters (e.g., dibutyl phthalate, dicyclohexyl phthalate, di-2ethylhexyl phthalate, decyl phthalate, bis(2,4-di-tamyl-phenyl)phthalate, bis(2,4-di-t-amylphenyl)isophthalate, bis(1,1-diethylpropyl)phthalate), phosphoric or phosphonic esters (e.g., triphenyl phosphate, tricresyl phosphate, 2-ethylhexyl diphenyl phosphate, tricyclohexyl phosphate, tri-2-ethylhexyl phosphate, tridecyl phosphate, tributoxy ethyl phosphate, trichloropropyl phosphate, di-2-ethylhexyl phenyl phosphonate), benzoic esters (e.g., 2-ethylhexyl benzoate, dodecyl benzoate, 2-ethylhexyl-p-hydroxy benzoate), amides (e.g., N,N-di-ethyldodecanamide, N,N-diethyllaurylamide, N-tetradecylpyrrolidone), alcohols or phenols (e.g., isostearyl alcohol, 2,4-di-tert-amylphenol), aliphatic carboxylic esters (e.g., bis(2-ethylhexyl)sebacate, dioctyl azerate, glycerol tributylate, isostearyl lactate, trioctyl citrate), aniline derivatives (e.g., N,N-dibutyl-2-butoxy-5-tert-octylaniline), and hydrocarbons (e.g., paraffin, dodecylbenzene, diisopropyl naphthalene). As an auxiliary solvent, an organic solvent having a boiling point of about 30° C. or higher, preferably 50° C. to about 160° C., can be used. Typical examples of such an organic solvent include ethyl acetate, butyl acetate, ethyl propionate, methyl ethyl ketone, cyclohexanone, 2-ethoxyethyl acetate, and dimethylformamide.

The process and effects of the latex dispersion method and specific examples of latexes to be used in dipping are described in U.S. Pat. No. 4,199,363 and West German Patent Application (OLS) 2,541,274 and 2,541,230.

The color light-sensitive material of the present invention preferably comprises various antiseptics or antifungal agents such as phenetyl alcohol and 1,2-benzisothiazoline-3-one, n-butyl-p-hydroxybenzoate, phenol, 4-chloro-3,5-dimethylphenol, 2-phenoxyethanol and 2-(4-thiazolyl)benzimidazole as described in JP-A-63-257747, JP-A-62-272248 and JP-A-1-80941.

The present invention is applicable to various types of color light-sensitive materials, particularly preferably to color negative films for common use or motion picture, color reversal films for slide or television, color papers, color positive films and color reversal papers.

Suitable supports which can be used in the present invention are described in the above-cited RD No. 17643 (page 28), No. 18716 (right column on page 647 to left column on page 648), and No. 307105 (page 897).

In the present light-sensitive material, the total thickness of all hydrophilic colloidal layers on the emulsion side is preferably in the range of 28 $\mu$m or less, more preferably 23 $\mu$m or less, further preferably 18 $\mu$m or less, particularly 16 $\mu$m or less. The film swelling T$\frac{1}{2}$ is preferably in the range of 30 seconds or less, more preferably 20 seconds or less. In the present invention, the film thickness is determined after being stored at a temperature of 25° C. and a relative humidity of 55% for 2 days. The film swelling T$\frac{1}{2}$ can be determined by a method known in the art, e.g., by means of a swellometer of the type as described in A. Green et al., "Photographic Science and Engineering", vol. 19, No. 2, pp.

124-129. $T_{\frac{1}{2}}$ is defined as the time taken until half the saturated film thickness is reached wherein the saturated film thickness is 90% of the maximum swollen film thickness reached when the light-sensitive material is processed with a color developer at a temperature of 30° C. over 195 seconds.

The film swelling $T_{\frac{1}{2}}$ can be adjusted by adding a film hardener to gelatin as a binder or altering the ageing condition after coating. The percentage swelling of the light-sensitive material is preferably in the range of 150 to 400%. The percentage swelling can be calculated from the maximum swollen film thickness determined as described above in accordance with the equation: (maximum swollen film thickness-film thickness)/film thickness.

The light-sensitive material of the present invention preferably comprises a hydrophilic colloidal layer (hereinafter referred to as "back layer") having a total dried thickness of 2 $\mu$m to 20 $\mu$m on the side of the support opposite from the emulsion layer side. The back layer preferably contains the above mentioned light absorbent, filter dye, ultraviolet absorbent, antistatic agent, film hardener, binder, plasticizer, lubricant, coating aid, surface active agent, etc. The back layer preferably exhibits a percentage swelling of 150 to 500%.

The color photographic light-sensitive material according to the present invention can be developed in accordance with an ordinary method as described in RD Nos. 17643 (pp. 28-29), 18716 (left column-right column on page 651) and 30710 (pp. 880-881).

The color developer to be used in the development of the present light-sensitive material is preferably an alkaline aqueous solution containing as a main component an aromatic primary amine color developing agent. As such a color developing agent, an aminophenolic compound can be effectively used. In particular, p-phenylenediamine compounds are preferably used. Typical examples such p-phenylenediamine compounds include 3-methyl-4-amino-N,N-diethylaniline, 3-methyl-4-amino-N-ethyl-N-$\beta$-hydroxyethylaniline, 3-methyl-4-amino-N-ethyl-N-$\beta$-methanesulfonamideethylaniline, 3-methyl-4-amino-N-ethyl-N-$\beta$-methoxyethylaniline, and sulfates, hydrochlorides and p-toluenesulfonates thereof. Particularly preferred among these compounds is 3-methyl-4-amino-N-ethyl-N-$\beta$-hydroxyethylaniline sulfate. These compounds can be used in a combination of two or more thereof, depending on the purpose of application.

The color developer normally contains a pH buffer such as a carbonate and phosphate of an alkaline metal or a development inhibitor or fog inhibitor such as chlorides, bromides, iodides, benzimidazoles, benzothiazoles and mercapto compounds. If desired, the color developer may further contain various preservatives such as hydroxylamine, diethylhydroxylamine, sulfites, hydrazines (e.g., N,N-biscarboxymethylhydrazine), phenylsemicarbazides, triethanolamine and catecholsulfonic acids, organic solvents such as ethylene glycol and diethylene glycol, development accelerators such as benzyl alcohol, polyethylene glycol, quaternary ammonium salts, and amines, color-forming couplers, competing couplers, auxiliary developing agents such as 1-phenyl-3-pyrazolidone, viscosity-imparting agents, various chelating agents exemplified by aminopolycarboxylic acids, aminopolyphosphoric acids, alkylphospnonic acids, and phosphonocarboxylic acids (e.g., ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphosphonic acid, nitrilo-N,N,N-trimethylenephosphonic acid, ethylenediamine-N,N,N',N'-tetramethylenephosphonic acid, and ethylenediamine-di(o-hydroxyphenylacetic acid), and salts thereof).

Reversal processing is usually carried out by black-and-white development followed by color development. Black-and-white developers to be used can contain one or more of known black-and-white developing agents, such as dihydroxybenzenes, e.g., hydroquinone, 3-pyrazolidones, e.g., 1-phenyl-3-pyrazolidone, and aminophenols, e.g., N-methyl-p-aminophenol. The color developer or black-and-white developer usually has a pH of from 9 to 12. The replenishment rate of the developer is usually 3 l or less per m$^2$ of the light-sensitive material, though depending on the type of the color photographic material to be processed. The replenishment rate may be reduced to 500 ml/m$^2$ or less by decreasing the bromide ion concentration in the replenisher. If the replenishment rate is reduced, the area of the processing tank in contact with air is preferably reduced to inhibit the evaporation and air oxidation of the processing solution.

The area of the photographic processing solution in contact with air in the processing tank can be represented by an opening value as defined by the following equation:

$$\text{Opening value} = \frac{[\text{area of processing solution in contact with air (cm}^2)]}{[\text{volume of processingsolution (cm}^3)]}$$

The opening value as defined above is preferably in the range of 0.1 or less, more preferably 0.001 to 0.05. Examples of methods for reducing the opening value include a method which comprises putting a cover such as floating lid on the surface of the processing solution in the processing tank, a method as disclosed in JP-A-1-82033 utilizing a mobile lid, and a slit development method as disclosed in JP-A-63-216050. The reduction of the opening value is preferably effected in both color development and black-and-white development steps, as well as in all the subsequent steps such as bleach, blix, fixing, rinse and stabilization. The replenishment rate can also be reduced by a means for suppressing accumulation of the bromide ion in the developing solution.

The color processing time is normally in the range of 2 to 5 minutes. The processing time can be further reduced by carrying out color development at an elevated temperature and a high pH value with a color developing solution containing a color developing agent in a high concentration.

The photographic emulsion layer which has been color-developed is normally subjected to bleaching. Bleaching may be effected simultaneously with fixation (i.e., blixing), or these two steps may be carried out separately. For speeding up the processing, bleaching may be followed by blixing. Further, any of an embodiment wherein two blix baths connected in series are used, an embodiment wherein blixing is preceded by fixation, and an embodiment wherein blixing is followed by bleaching may be selected according to the purpose. Bleaching agents to be used include compounds of polyvalent metals, e.g., iron (III), peroxides, quinones, and nitro compounds. Typical examples of these bleaching agents are organic complex salts of iron (III), e.g., with aminopolycarboxylic acids such as ethylenediaminetetraacetic acid, diethylenetriaminepentaacetic acid, cyclohexanediaminetetraacetic acid, methyliminodiacetic acid, 1,3-diaminopropanetetraacetic acid, and glycol ether diaminetetraacetic acid, or citric acid, tartaric acid, malic acid, etc. Of these, aminopolycarboxylic acid-iron (III) complex salts such as (ethylenediaminetetraacetato)iron (III) complex salts and (1,3-diaminopropanetetraacetate)iron (III) complex salts are preferred in view of speeding up the processing and in view of conservation of the environment. In particular, aminopolycarboxylic acid-iron (III) complex salts are useful in both of a bleaching solution and a blix solution. The pH value of a bleaching solution or blix solution comprising such an aminopolycarboxylic acid-iron complex salts is normally in the range of 4.0 to 8. For speeding up the processing, the processing can be effected at an even lower pH value.

The bleaching bath, blix bath or a prebath thereof can contain, if desired, a bleaching accelerator. Examples of useful bleaching accelerators include compounds containing a mercapto group or a disulfide group as described in U.S. Pat. No. 3,893,858, West German Patents 1,290,812 and 2,059,988, JP-A-53-32736, JP-A-53-57831, JP-A-53-37418, JP-A-53-72623, JP-A-53-95630, JP-A-53-95631, JP-A-53-104232, JP-A-53-124424, JP-A-53-141623, and JP-A-53-28426, and Research Disclosure No. 17129 (July, 1978), thiazolidine derivatives as described in JP-A-50-140129, thiourea derivatives as described in U.S. Pat. No. 3,706,561, iodides as described in West German Patent 1,127,715 and JP-A-58-16235, polyoxyethylene compounds as described in West German Patents 966,410 and 2,748,430, polyamine compounds as described in JP-B-45-8836, compounds as described in JP-A-49-40943, JP-A-49-59644, JP-A-53-94927, JP-A-54-35727, JP-A-55-26506, and JP-A-58-163940, and bromine ions. Preferred among these compounds are compounds containing a mercapto group or disulfide group because of their significant acceleration effects. In particular, the compounds disclosed in U.S. Pat. No. 3,893,858, West German Patent 1,290,812, and JP-A-53-95630 are preferred. The compounds disclosed in U.S Pat. No. 4,552,834 are also preferred. These bleaching accelerators may be incorporated into the light-sensitive material. These bleaching accelerators are particularly effective for the blixing of color light-sensitive materials for picture taking.

The bleaching solution or blix solution preferably contains an organic acid besides the above-mentioned compounds for the purpose of inhibiting bleach stain. A particularly preferred organic acid is a compound with an acid dissociation constant (pKa) of 2 to 5. In particular, acetic acid, propionic acid, hydroxyacetic acid, etc. are preferred.

Examples of fixing agents to be contained in the fixing solution or blix solution include thiosulfates, thiocyanates, thioethers, thioureas, and a large amount of iodides. The thiosulfates are normally used. In particular, ammonium thiosulfate can be most widely used. Further, thiosulfates are preferably used in combination with thiocyanates, thioether compounds, thioureas, etc. As preservatives of the fixing or blix bath, sulfites, bisulfites, carbonyl bisulfite adducts or sulfinic acid compounds as described in EP-A-294769 can be preferably used. The fixing solution or blix solution preferably contains aminopolycarboxylic acids or organic phosphonic acids for the purpose of stabilizing the solution.

In the present invention, the fixing solution or blix solution preferably contains a compound with a pKa of 6.0 to 9.0, more preferably imidazoles such as imidazole, 1-methylimidazole, 1-ethylimidazole and 2-methylimidazole in an amount of 0.1 to 10 mol/l for the purpose of adjusting pH.

The total time required for the desilvering step is preferably as short as possible, provided no maldesilvering occurs. The desilvering time is preferably in the range of 1 to 3 minutes, more preferably 1 to 2 minutes. The processing temperature is in the range of 25° C. to 50° C., preferably 35° C. to 45° C. In the preferred temperature range, the desilvering rate can be improved and stain after processing can be effectively inhibited.

In the desilvering step, the agitation is preferably intensified as much as possible. Specific examples of such an agitation intensifying method include a method as described in JP-A-62-183460 which comprises jetting the processing solution to the surface of the emulsion layer in the light-sensitive material, a method as described in JP-A-62-183461 which comprises improving the agitating effect by a rotary means, a method which comprises improving the agitating effect by moving the light-sensitive material with the emulsion surface in contact with a wiper blade provided in the bath so that a turbulence occurs on the emulsion surface, and a method which comprises increasing the total circulated amount of processing solution. Such an agitation improving method can be effectively applied to the bleaching bath, blix bath or fixing bath. The improvement in the agitation effect can be considered to expedite the supply of a bleaching agent, fixing agent or the like into emulsion film, resulting in an improvement in desilvering rate. The above-mentioned agitation improving means can work more effectively when a bleach accelerator is used, remarkably increasing the bleach acceleration effect and eliminating the inhibition of fixing by the bleach accelerator.

The automatic developing machine to be used in the processing of the light-sensitive material of the present invention is preferably equipped with a light-sensitive material conveying means as disclosed in JP-A-60-191257, JP-A-60-191258, and JP-A-60-191259. Such a conveying means can remarkably reduce the amount of the processing solution carried from a bath to its subsequent bath, providing a significant effect with respect to inhibiting deterioration of the properties of the processing solution. This effect is remarkably effective for the reduction of the processing time or the amount of replenisher required at each step.

It is usual that the thus desilvered silver halide color photographic material of the invention is subjected to washing and/or stabilization. The quantity of water to be used in the washing can be selected from a broad range depending on the characteristics of the light-sensitive material (for example, the kind of couplers, etc.), the end use of the light-sensitive material, the temperature of the washing water, the number of washing tanks (number of stages), the replenishment system (e.g., counter-flow system or forward-flow system), and other various factors. Of these factors, the relationship between the number of washing tanks and the quantity of water in a multistage counter-flow system can be obtained according to the method described in "Journal of the Society of Motion Picture and Television Engineers", vol. 64, pp. 248–253 (May, 1955). According to the multistage counter-flow system described in the above reference, although the requisite amount of water can be greatly reduced, bacteria would grow due to an increase of the retention time of water in the tank, and floating masses of bacteria would stick to the light-sensitive material. In the present invention, in order to cope with this problem, the method of reducing calcium and magnesium ion concentrations described in JP-A-62-288838 can be used very effectively. Further, it is also effective to use isothiazolone compounds or thiabenzazoles as described in JP-A-57-8542, chlorine type bactericides, e.g., chlorinated sodium isocyanurate, benzotriazole, and bactericides described in Hiroshi Horiguchi, "Bokinbobaizai no kagaku" (1986), Eisei Gijutsu Gakkai (ed.), "Biseibutsu no mekkin, sakkin, bobigijutsu" (1982), and Nippon Sokin Bobi Gakkai (ed.), "Bokin bobizai jiten" (1986).

The washing water has a pH value of from 4 to 9, preferably from 5 to 8. The temperature of the water and the washing time can be selected from broad ranges depending on the characteristics and end use of the light-sensitive material, but they usually range from 15° to 45° C. for the temperature and from 20 seconds to 10 minutes for the time, preferably from 25° to 45° C. for the temperature and from 30 seconds to 5 minutes for the time. The light-sensitive material of the invention may be directly processed with a stabilizer in place of the washing step. For the stabilization, any of the known techniques as described in JP-A-57-8543, JP-A-58-14834, and JP-A-60-220345 can be used.

The aforesaid washing step may be followed by stabilization in some cases. For example, a stabilizing bath containing a dye stabilizer and a surface active agent is used as a final bath for color light-sensitive materials for picture taking. Examples of such a dye stabilizer include aldehyde such as formalin and glutaraldehyde, N-methylol compounds, hexamethylenetetramine, and aldehyde-bisulfite adducts. This stabilizing bath may also contain various chelating agents or antifungal agents.

The overflow accompanying replenishment of the washing bath and/or stabilizing bath can be reused in other steps such as desilvering.

In processing using an automatic developing machine, if the above-mentioned various processing solutions are subject to concentration due to evaporation, the concentration is preferably corrected for by the addition of water.

The silver halide color light-sensitive material of the present invention may contain a color developing agent for the purpose of simplifying and expediting processing. Such a color developing agent is preferably used in the form of various precursors. Examples of such precursors include indoaniline compounds as described in U.S. Pat. No. 3,342,597, Schiff's base type compounds as described in U.S. Pat. No. 3,342,599, and Research Disclosure Nos. 14,850 and 15,159, and aldol compounds as described in Research Disclosure No. 13,924, metal complexes as described in U.S. Pat. No. 3,719,492, and urethane compounds as described in JP-A-53-135628.

The silver halide color light-sensitive material of the present invention may optionally comprise various 1-phenyl-3-pyrazolidones for the purpose of accelerating color development. Typical examples of such compounds are described in JP-A-56-64339, JP-A-57-144547, and JP-A-58-115438.

In the present invention, the various processing solutions are used at a temperature of 10° C. to 50° C. The standard temperature range is normally from 33° C. to 38° C. However, a higher temperature range can be used to accelerate processing, thereby reducing the processing time. In contrast, a lower temperature range can be used to improve the picture quality or the stability of the processing solutions.

Further, the silver halide light-sensitive material of the present invention can also be applied to a heat-developable light-sensitive material as disclosed in U.S. Pat. No. 4,500,626, JP-A-60-133449, JP-A-59-218443, and JP-A-61-238056, and EP-A2-210660.

The compound of the present invention is used in an amount of from 5 to 4000 mg/m$^2$, preferably from 20 to 2000 mg/m$^2$ in the silver halide photographic material of the present invention. The compound of the present invention is added to a protective layer and a back layer. It is preferred to be added in a back layer.

The present invention will be further described in the following examples, but the present invention should not be construed as being limited thereto. Unless otherwise indicated, all parts, percents, ratios, and the like are by weight.

EXAMPLE (1) Preparation of specimens

A back layer comprising the components given below was coated on one side of an undercoated triacerate film support in accordance with an ordinary method. A multi-layer color emulsion layer comprising the components given below was coated on the other side of the support. Thus, Specimens (1) to (10) were prepared. These specimens were then dried to prepare color negative light-Sensitive materials.

These layers had the following formulations:
(Back layer A)

| 1st layer: | |
|---|---|
| Ethylene glycol | 270 ml |
| Methanol | 6 l |
| Acetone | 4 l |
| Antistatic agent (indicated in Table 1) | 35 g |

The above-mentioned composition was coated in an amount of 15 ml/m$^2$, and then dried at a temperature of 70° C. for 3 minutes.

| 2nd layer: | |
|---|---|
| Acetone | 8.5 l |
| Methanol | 1.5 l |
| Diacetyl cellulose | 90 g |
| Finely divided SiO$_2$ grains (average grain diameter: 0.1 μm) | 7 g |

The above mentioned composition was coated in an amount of 20 ml/m$^2$, and then dried at a temperature of 100° C. for 3 minutes.
(Back layer B)

| Acetone | 6 l |
|---|---|
| Methanol | 4 l |
| Diacetyl cellulose | 60 g |
| Antistatic agent (indicated in Table 1) | 40 g |

The above mentioned composition was coated in an amount of 20 ml/m$^2$, and then dried at a temperature of 100° C. for 3 minutes.
(Emulsion layer)

Various layers comprising the formulations described in JP-A-3-168638 were coated. These layers were as follows:

| | |
|---|---|
| 1st layer | (antihalation layer) |
| 2nd layer | (low sensitivity red-sensitive emulsion layer) |
| 3rd layer | (middle sensitivity red-sensitive emulsion layer) |
| 4th layer | (high sensitivity red-sensitive emulsion layer) |
| 5th layer | (interlayer) |
| 6th layer | (low sensitivity green-sensitive emulsion layer) |
| 7th layer | (middle sensitivity green-sensitive emulsion layer) |
| 8th layer | (high sensitivity green-sensitive emulsion layer) |
| 9th layer | (interlayer) |
| 10th layer | (donor layer having an interlayer effect on red-sensitive layer) |
| 11th layer | (yellow filter layer) |
| 12th layer | (low sensitivity blue-sensitive emulsion layer) |
| 13th layer | (interlayer) |
| 14th layer | (high sensitivity blue-sensitive emulsion layer) |
| 15th layer | (1st protective layer) |
| 16th layer | (2nd protective layer) |

With reference to the 15th and 16th layers, detailed formulations will be given below to help in understanding these layers.

| 15th layer (1st protective layer) | |
|---|---|
| Finely divided silver iodobromide emulsion (AgI content: 2 mole %; uniform AgI type; grain diameter: 0.07 μm (as determined in terms of a sphere)) | 0.12 g/m² (in terms of silver) |
| Gelatin | 0.9 g/m² |
| UV-4 | 0.11 g/m² |

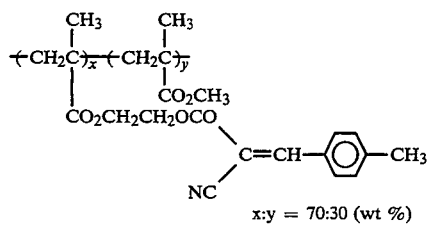

x:y = 70:30 (wt %)

| UV-5 | 0.16 g/m² |
|---|---|

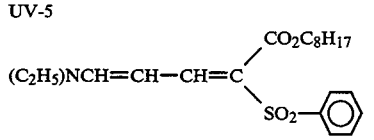

| Trihexl phosphate | 0.02 g/m² |
|---|---|
| H-1 (CH$_2$=CHSO$_2$CH$_2$CONHCH$_2$)$_2$ | 0.13 g/m² |
| Cpd-5 | 0.10 g/m² |
| Polyethyl acrylate latex | 0.09 g/m² |

The chemical structure of Cpd-5 is as follows:

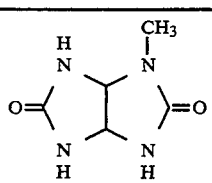
Cpd-5

| 16th layer (2nd protective layer) | |
|---|---|
| Finely divided silver iodobromide emulsion (AgI content: 2 mole %; uniform AgI type; grain diameter: 0.07 μm (as determined in terms of sphere)) | 0.36 g/m² (in terms of silver) |
| Gelatin | 0.55 g/m² |
| Polyacrylamide (molecular weight: 45,000) | 0.05 g/m² |
| Dextran (molecular weight: 38,000) | 0.05 g/m² |
| Sodium polyacrylate | 0.005 g/m² |
| Sodium polystyrenesulfonate | 0.01 g/m² |
| Colloidal silica (grain diameter: 0.02 μm) | 0.04 g/m² |
| Poly(polymerization degree: 10) oxyethylene cetyl ether | 0.004 g/m² |
| Poly(polymerization degree: 10)oxyethylene poly(polymerization degree: 3)glyceryl-p-octylphenyl ether | 0.004 g/m² |
| Cpd-6 | 0.001 g/m² |
| Cpd-7 | 0.001 g/m² |
| Cpd-8 | 0.001 g/m² |
| Cpd-9 | 0.001 g/m² |
| Cpd-10 | 0.005 g/m² |
| Potassium nitrate | 0.05 g/m² |
| Sodium p-t-octylphenoxyethoxyethoxyethanesulfonate | 0.002 g/m² |
| 4-Hydroxy-6-methyl-1,3,3a,7-tetraza indene | 0.04 g/m² |
| Cetyl palmitate (dispersed in sodium dodecylbenzenesulfonate; grain diameter: 0.01 μm) | 0.01 g/m² |
| Dimethyl siloxane (dispersed in sodium dioctyl-α-sulfosuccinate; grain diameter: 0.12 μm) | 0.01 g/m² |
| Liquid paraffin (dispersed in sodium dioctyl-α-sulfosuccinate; grain diameter: 0.11 μm) | 0.01 g/m² |

Besides the above-mentioned components, an emulsion stabilizer Cpd-3 and a surface active agent Cpd-4 were incorporated as coating aids in each of these layers in an amount of 0.07 g/m² and 0.03 g/m², respectively.

The chemical structure of Cpd-3, Cpd-4, Cpd-6, Cpd-7, Cpd-8, Cpd-9, and Cpd-10 are as follows:

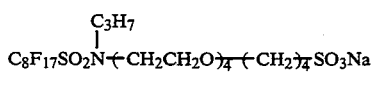
Cpd-6

Cpd-7

Cpd-8

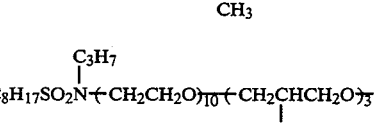
Cpd-9

-continued

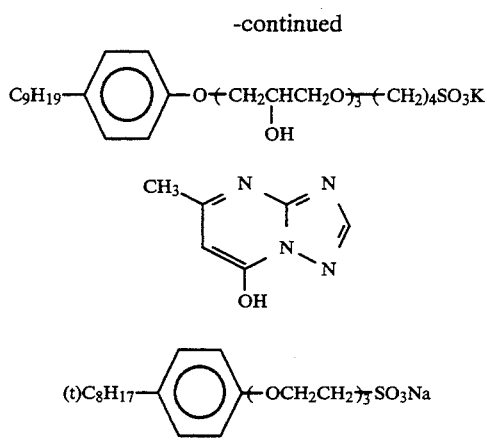

(2) Processing method

The specimens thus obtained were then processed in the following processing steps by means of an automatic developing machine.

Processing method

| Step | Processing Time | Processing temperature | Replenishment rate* | Tank capacity |
|---|---|---|---|---|
| Color development | 3 min. 15 sec. | 38° C. | 15 ml | 20 l |
| Bleaching | 6 min. 30 sec. | 38° C. | 10 ml | 40 l |
| Rinsing | 2 min. 10 sec. | 35° C. | 10 ml | 20 l |
| Fixing | 4 min. 20 sec. | 38° C. | 20 ml | 30 l |
| Rinsing (1) | 1 min. 05 sec. | 35° C. | ** | 10 l |
| Rinsing (2) | 1 min. 00 sec. | 35° C. | 20 ml | 10 l |
| Stabilization | 1 min. 05 sec. | 38° C. | 10 ml | 10 l |
| Drying | 4 min. 20 sec. | 55° C. | | |

*per m of 350 cm$^2$
**The rinse step was effected in a counter-flow process wherein the washing water flows backward from the tank (2) to the tank (1).

The formulation of the various processing solutions were as follows:

| | Running Solution (g) | Replenisher (g) |
|---|---|---|
| Color developer | | |
| Diethylenetriaminepentaacetic acid | 1.0 | 1.1 |
| 1-Hydroxyethylidene-1,1-diphosphonic acid | 3.0 | 3.2 |
| Sodium sulfite | 4.0 | 4.9 |
| Potassium carbonate | 30.0 | 30.0 |
| Potassium bromide | 1.4 | — |
| Potassium iodide | 1.5 mg | — |
| Hydroxylamine sulfate | 2.4 | 3.6 |
| 4-(N-ethyl-N-β-hydroxyethylamino)-2-methylaniline sulfate | 4.5 | 7.2 |
| Water to make | 1.0 l | 1.0 l |
| pH | 10.05 | 10.10 |
| Bleaching solution | | |
| Sodium ethylenediaminetetraacetato ferrate trihydrate | 100.0 | 140.0 |
| Disodium ethylenediaminetetraacetate | 10.0 | 11.0 |
| Ammonium bromide | 140.0 | 180.0 |
| Ammonium nitrate | 30.0 | 40.0 |
| 27% Aqueous ammonia | 6.5 ml | 2.5 ml |
| Water to make | 1.0 l | 1.0 l |
| pH | 6.0 | 5.5 |
| Fixing solution | | |
| Disodium ethylenediaminetetraacetate | 0.5 | 1.0 |

| | Running Solution (g) | Replenisher (g) |
|---|---|---|
| Sodium sulfite | 7.0 | 12.0 |
| Sodium bisulfite | 5.0 | 9.5 |
| 70% Aqueous solution of ammonium thiosulfate | 170.0 ml | 240.0 ml |
| Water to make | 1.0 l | 1.0 l |
| pH | 6.70 | 6.6 |

Rinsing solution (common to both running solution and replenisher)

Tap water was passed through a mixed bed column filled with an H type strongly acidic cation exchange resin (Amberlite IR-120B produced by Rohm & Haas) and an OH type anion exchange resin (Amberlite IR-400) so that the calcium and magnesium ion concentrations were each reduced to 3 mg/l or less. 20 mg/l of dichlorinated sodium isocyanurate and 1.5 g/l of sodium sulfate were then added to the solution. The pH range of the solution was from 6.5 to 7.5.

| Stabilizing solution | Running Solution (g) | Replenisher (g) |
|---|---|---|
| 37% Formalin | 2.0 ml | 3.0 ml |
| Polyoxyethylene-p-monononyl phenyl ether (average polymerization degree: 10) | 0.3 | 0.45 |
| Disodium ethylenediaminetetraacetate | 0.05 | 0.08 |
| Water to make | 1.0 l | 1.0 l |
| pH | 5.0–8.0 | 5.0–8.0 |

These specimens were then compared with each other for antistatic properties and developer stain-proofing properties in accordance with the following method. The results are set forth in Table 1.

TABLE 1

| Specimen No. | Antistatic agent | Back layer | Specific surface resistivity (Ω) | Drop in absorbance of developer (at 660 nm) |
|---|---|---|---|---|
| Specimen 1 (present invention) | P-1 | A | 5.8 × 10$^9$ | 0.01 |
| Specimen 2 (present invention) | P-3 | A | 6.6 × 10$^9$ | 0.01 |
| Specimen 3 (present invention) | P-7 | A | 5.2 × 10$^9$ | 0.01 |
| Specimen 4 (present invention) | P-1 | B | 3.5 × 10$^9$ | 0.01 |
| Specimen 5 (present invention) | P-3 | B | 3.2 × 10$^9$ | 0.02 |
| Specimen 6 (present invention) | P-7 | B | 4.2 × 10$^9$ | 0.01 |
| Specimen 7 (comparative example) | Q-1 | A | 4.5 × 10$^9$ | 0.14 |
| Specimen 8 (comparative example) | Q-2 | A | 1.1 × 10$^{11}$ | 0.08 |
| Specimen 9 (comparative example) | Q-3 | A | 5.5 × 10$^9$ | 0.15 |
| Specimen 10 (comparative example) | Q-4 | A | 8.2 × 10$^9$ | 0.12 |

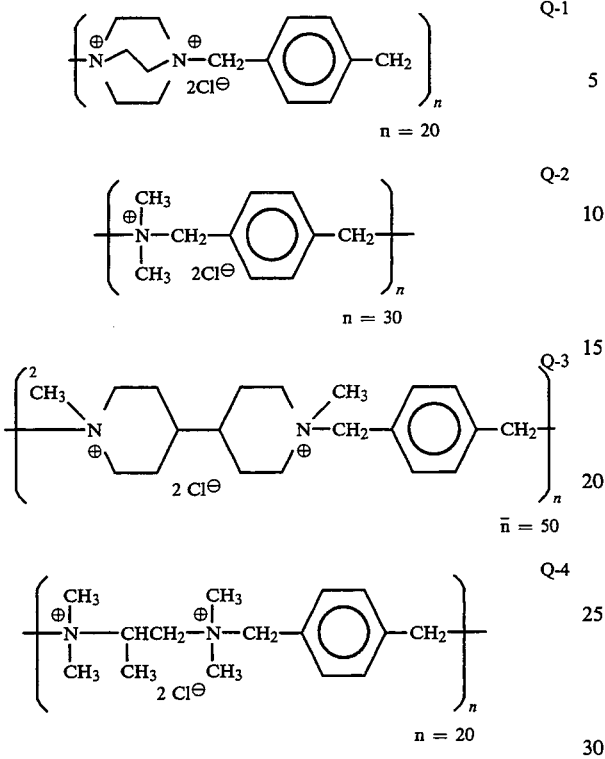

(1) Evaluation of antistatic properties

These specimens were measured for specific surface resistivity at an applied voltage of 100 V and a relative humidity of 30% by means of Type TR-8601 measuring instrument (produced by Takeda Riken K. K. ) in accordance with JIS-K-6911 (1979 ).

( 2 ) Developer stainproofing properties 5 m² of each of these specimens was dipped in the color developer for 3 minutes, and then withdrawn. The color developer was allowed to stand at room temperature for 2 hours, and then measured for absorbance at 660 nm by means of Type 100-60 spectrophotometer (produced by Hitachi, Ltd.). For the evaluation of developer stainproofing properties, the measured values were compared with that before dipping.

Table 1 shows that Specimens 1 to 6 according to the present invention exhibit an excellent low specific surface resistivity and good developer stainproofing properties. On the other hand, Specimens 7 to 10 comprising comparative compounds exhibit excellent antistatic properties but show poor developer stainproofing properties.

Thus, it can be seen that the present invention exhibits excellent developer stainproofing properties while maintaining excellent antistatic properties as compared with antistatic agents in the art.

As mentioned above, the compound of the present invention can be synthesized in one stage in an organic solvent system. If used as an antistatic agent, the compound of the present invention not only eliminates the problem of contaminating the developer caused by elution with the developer and subsequent contamination of the developer but also exhibits excellent antistatic properties.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising constituent layers including at least one light-sensitive silver halide emulsion layer on a support, wherein at least one of the constituent layers contains a cationic high-molecular weight compound represented by formula (I):

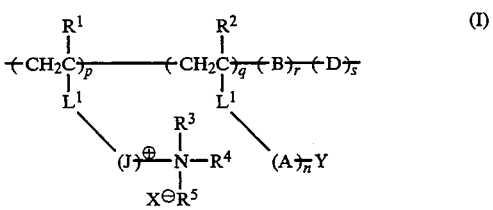

wherein $R^1$ and $R^2$ may be the same or different and each represents a hydrogen atom or $C_{1-6}$ lower alkyl group; $L^1$ represents —COO— or —CONH— and $L^2$ represents a divalent group; J represents a $C_{1-20}$ alkylene group or $C_{7-20}$ aralkylene group; $R^3$, $R^4$ and $R^5$ may be the same or different and each represents a $C_{1-20}$ alkyl group or $C_{7-20}$ aralkyl group; $X^-$ represents an anion; A represents a repeating unit made from an ethylenically unsaturated monomer; n represents a number-average polymerization degree of from 2 to 1,000; Y represents a monovalent connecting group; B represents divinylbenzene, allyl acrylate, ally methacrylate, N-allyl methacrylamide, 4,4′-isopropylidene diphenylene diacrylate, 1,3-butylene diacrylate, 3-butylene dimethacrylate, 4-cyclohexylene dimethylene dimethacrylate, diethylene glycol dimethacrylate, diisopropylidene glycol dimethacrylate, divinyloxymethane, ethylene glycol diacrylate, ethylene glycol dimethacrylate, ethylidene diacrylate, ethylidene dimethacrylate, 1,6-diacrylamide hexane, 1,6-hexamethylene diacrylate, 1,6-hexamethylene dimethacrylate, N,N′-methylene bisacrylamide, N,N′-(2-dihydroxy)ethylenebisacrylamide, 2,2-dimethyl-3-trimethylenedimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, pentaerythritol triacrylate, trimethylol propane triacrylate, tetramethylolmethane tetraacrylate, triethylene glycol dimethacrylate, 1,3,5-triacryloylhexahydro-s-triazine, bisacrylamidoacetic acid ethylidene trimethacrylate propylidene triacrylate vinylallyloxy acetate, vinyl methacrylate, or 1-vinyloxy-2-allyloxyethane; D represents a repeating unit made from an ethylenically unsaturated monomer; and p, q, r and s each represents a monomer component weight percentage, with the proviso that p, q, r and s are 1 to 99% by weight, 0.5 to 70% by weight, 1 to 40% by weight and 0.1 to 20% by weight, respectively, and p+q+r+s=100.

2. A silver halide photographic material according to claim 1, wherein $R^3$, $R^4$ and $R^5$ each represents a $C_{1-6}$ alkyl group.

3. A silver halide photographic material according to claim 1, wherein $R^3$, $R^4$ and $R^5$ each is a methyl group.

4. A silver halide photographic material according to claim 1, wherein A represents 2-ethylhexyl acrylate, stearyl methacrylate, styrene, methyl methacrylate, or butyl acrylate.

5. A silver halide photographic material according to claim 1, which is substantially free of components which are elutable with a processing solution.

6. A silver halide photographic material according to claim 1, which comprises dispersion-polymerized grains having an average grain diameter of 0.25 μm or less.

7. A silver halide photographic material according to claim 1, wherein $R^1$ represents a hydrogen atom or a methyl group.

8. A silver halide photographic material according to claim 1, wherein J represents a $C_{2-6}$ alkylene group.

9. A silver halide photographic material according to claim 1, wherein $X^-$ represents $Cl^-$.

10. A silver halide photographic material according to claim 1, wherein B represents N,N'-methylenebisacrylamide, or ethylene glycol dimethacrylate.

11. A silver halide photographic material according to claim 1, wherein p, q, r, and s are 50 to 99% by weight, 1 to 30% by weight, 1 to 20% by weight, and 0.1 to 20% by weight, respectively.

12. A silver halide photographic material according to claim 1, wherein the compound is made by a dispersion polymerization method.

* * * * *

UNITED STATES PATENT AND TRADEMARK OFFICE
CERTIFICATE OF CORRECTION

PATENT NO. : 5,362,613

DATED : November 8, 1994

INVENTOR(S) : Kentaro Shiratsuchi et al.

It is certified that error appears in the above-identified patent and that said Letters Patent is hereby corrected as shown below:

In the Abstract, at line 3, delete

" 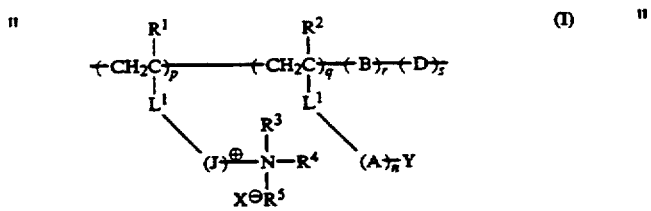 (I) "

and insert therefor

-- 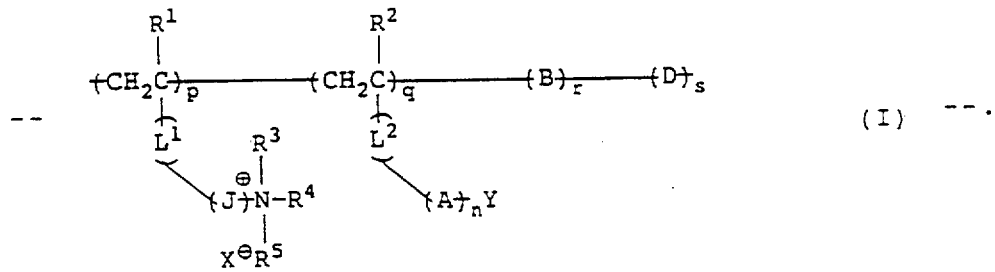 (I) --.

UNITED STATES PATENT AND TRADEMARK OFFICE
CERTIFICATE OF CORRECTION

PATENT NO. : 5,362,613
DATED : November 8, 1994
INVENTOR(S) : Kentaro Shiratsuchi et al.

It is certified that error appears in the above-identified patent and that said Letters Patent is hereby corrected as shown below:

Column 3, lines 31-39, delete

"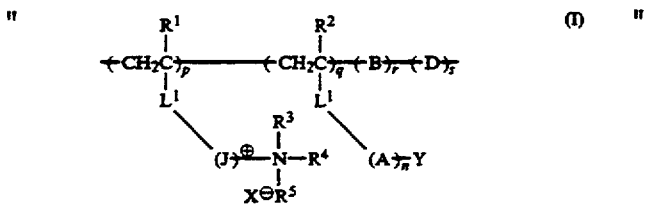 (I)"

and insert therefor

-- 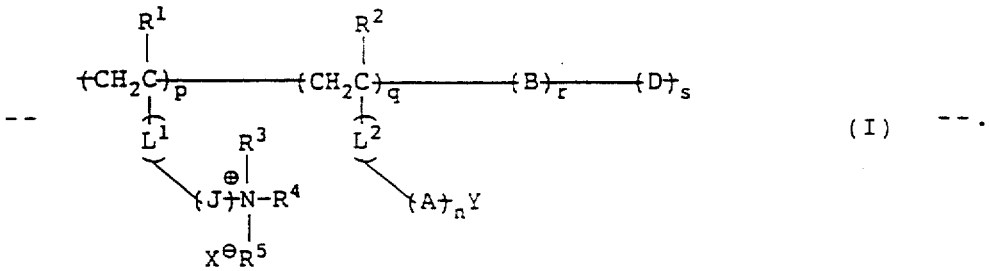 (I) --.

UNITED STATES PATENT AND TRADEMARK OFFICE
CERTIFICATE OF CORRECTION

PATENT NO. : 5,362,613

DATED : November 8, 1994

INVENTOR(S) : Kentaro Shiratsuchi et al.

It is certified that error appears in the above-identified patent and that said Letters Patent is hereby corrected as shown below:

Column 4, lines 1-9, delete

"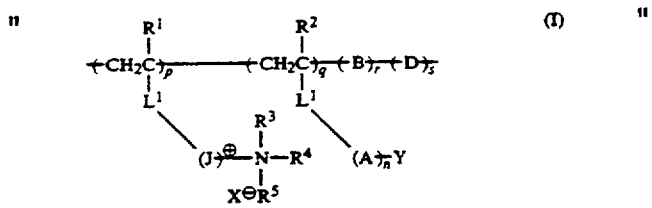 (I)"

and insert therefor

-- 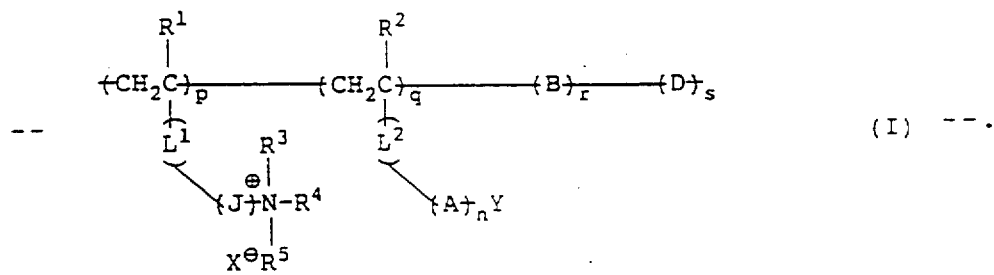 (I) --.

UNITED STATES PATENT AND TRADEMARK OFFICE
CERTIFICATE OF CORRECTION

PATENT NO. : 5,362,613
DATED : November 8, 1994
INVENTOR(S) : Kentaro Shiratsuchi et al.

It is certified that error appears in the above-identified patent and that said Letters Patent is hereby corrected as shown below:

Column 48, lines 11-19, delete

"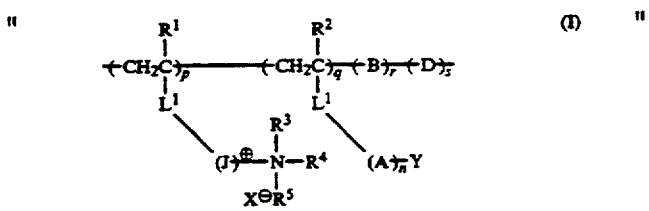 (I) "

and insert therefor

-- 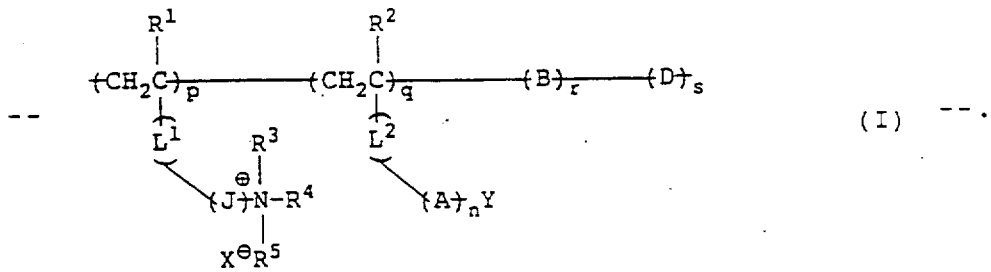 (I) --.

Signed and Sealed this

Twenty-ninth Day of August, 1995

Attest:

BRUCE LEHMAN

*Attesting Officer*   *Commissioner of Patents and Trademarks*